US009818032B2

(12) United States Patent
Yehezkel Rohekar et al.

(10) Patent No.: US 9,818,032 B2
(45) Date of Patent: Nov. 14, 2017

(54) AUTOMATIC VIDEO SUMMARIZATION

(71) Applicant: Intel Corporation, Santa Clara, CA (US)

(72) Inventors: Raanan Y. Yehezkel Rohekar, Kiryat Ekron (IL); Guy Koren, Haifa (IL)

(73) Assignee: Intel Corporation, Santa Clara, CA (US)

( * ) Notice: Subject to any disclaimer, the term of this patent is extended or adjusted under 35 U.S.C. 154(b) by 65 days.

(21) Appl. No.: 14/925,701

(22) Filed: Oct. 28, 2015

(65) Prior Publication Data

US 2017/0124400 A1 May 4, 2017

(51) Int. Cl.
| | |
|---|---|
| *G06K 9/00* | (2006.01) |
| *G06K 9/46* | (2006.01) |
| *G06K 9/52* | (2006.01) |
| *G06T 7/60* | (2017.01) |
| *G06T 11/20* | (2006.01) |
| *G06F 17/30* | (2006.01) |

(52) U.S. Cl.
CPC ......... *G06K 9/00751* (2013.01); *G06F 17/30* (2013.01); *G06K 9/00335* (2013.01); *G06K 9/00718* (2013.01); *G06K 9/4604* (2013.01); *G06K 9/52* (2013.01); *G06T 7/60* (2013.01); *G06T 11/206* (2013.01)

(58) Field of Classification Search
None
See application file for complete search history.

(56) References Cited

U.S. PATENT DOCUMENTS

| | | | | |
|---|---|---|---|---|
| 7,194,134 | B2 * | 3/2007 | Bradshaw | G06K 9/685 358/453 |
| 7,499,916 | B2 * | 3/2009 | Liu | G06F 17/30256 |
| 7,813,822 | B1 * | 10/2010 | Hoffberg | G06K 9/00369 381/73.1 |
| 2003/0195883 | A1 * | 10/2003 | Mojsilovic | G06F 17/30256 |
| 2006/0274949 | A1 * | 12/2006 | Gallagher | G06K 9/00697 382/228 |
| 2007/0101269 | A1 * | 5/2007 | Hua | G06F 17/30811 715/723 |
| 2009/0208106 | A1 * | 8/2009 | Dunlop | G06K 9/00664 382/173 |

(Continued)

FOREIGN PATENT DOCUMENTS

WO WO-2009009692 A2 1/2009

OTHER PUBLICATIONS

"International Application Serial No. PCT/US2016/050714, International Search Report dated Dec. 21, 2016", 3 pgs.

(Continued)

*Primary Examiner* — Tsung-Yin Tsai
(74) *Attorney, Agent, or Firm* — Schwegman Lundberg & Woessner, P.A.

(57) ABSTRACT

System and techniques for automatic video summarization are described herein. A video may be obtained and a semantic model of the video may be generated from frames of the video. Respective relevancy scores may be assigned to the frames. The semantic model may be initialized with the respective relevancy scores. The semantic model may then be iteratively processed to produce sub-scenes of the video, the collection of sub-scenes being the video summarization.

25 Claims, 11 Drawing Sheets

(56) References Cited

U.S. PATENT DOCUMENTS

| | | | |
|---|---|---|---|
| 2009/0257663 A1* | 10/2009 | Luo | G06F 17/30265 382/224 |
| 2011/0263946 A1* | 10/2011 | el Kaliouby | A61B 5/1128 600/300 |
| 2012/0099784 A1* | 4/2012 | Marchesotti | G06F 17/3025 382/162 |
| 2012/0099793 A1 | 4/2012 | Kumar et al. | |
| 2012/0106925 A1 | 5/2012 | Dirik et al. | |
| 2012/0158739 A1* | 6/2012 | Ah-Pine | G06F 17/30023 707/748 |
| 2013/0038737 A1* | 2/2013 | Yehezkel | G08B 13/19693 348/159 |
| 2013/0073387 A1* | 3/2013 | Heath | G06Q 50/01 705/14.53 |
| 2013/0259375 A1* | 10/2013 | Dunlop | G06K 9/00684 382/173 |
| 2013/0259390 A1* | 10/2013 | Dunlop | G06K 9/00718 382/224 |
| 2013/0293776 A1 | 11/2013 | Shih-Fu et al. | |
| 2014/0037269 A1 | 2/2014 | Kumar et al. | |
| 2016/0210602 A1* | 7/2016 | Siddique | G06Q 20/0453 |

OTHER PUBLICATIONS

"International Application Serial No. PCT/US2016/050714, Written Opinion dated Dec. 21, 2016", 5 pgs.

* cited by examiner

AUTOMATIC VIDEO SUMMARIZATION

TECHNICAL FIELD

Embodiments described herein generally relate to computer vision systems and more specifically to automatic video summarization.

BACKGROUND

Computer vision systems generally involve advances that allow computers to process image data to derive meaning from that data. Computer vision is an aspect of artificial intelligence, a field concerned with developing artificial systems to perform cognitive tasks that have traditionally required a living actor, such as a person. Video is generally made up of a sequence of still images. Video summarization, as used herein, refers to selecting sub-sequences of video to create sub-scenes of the video. These sub-scenes may be referred to as clips, highlights, etc.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
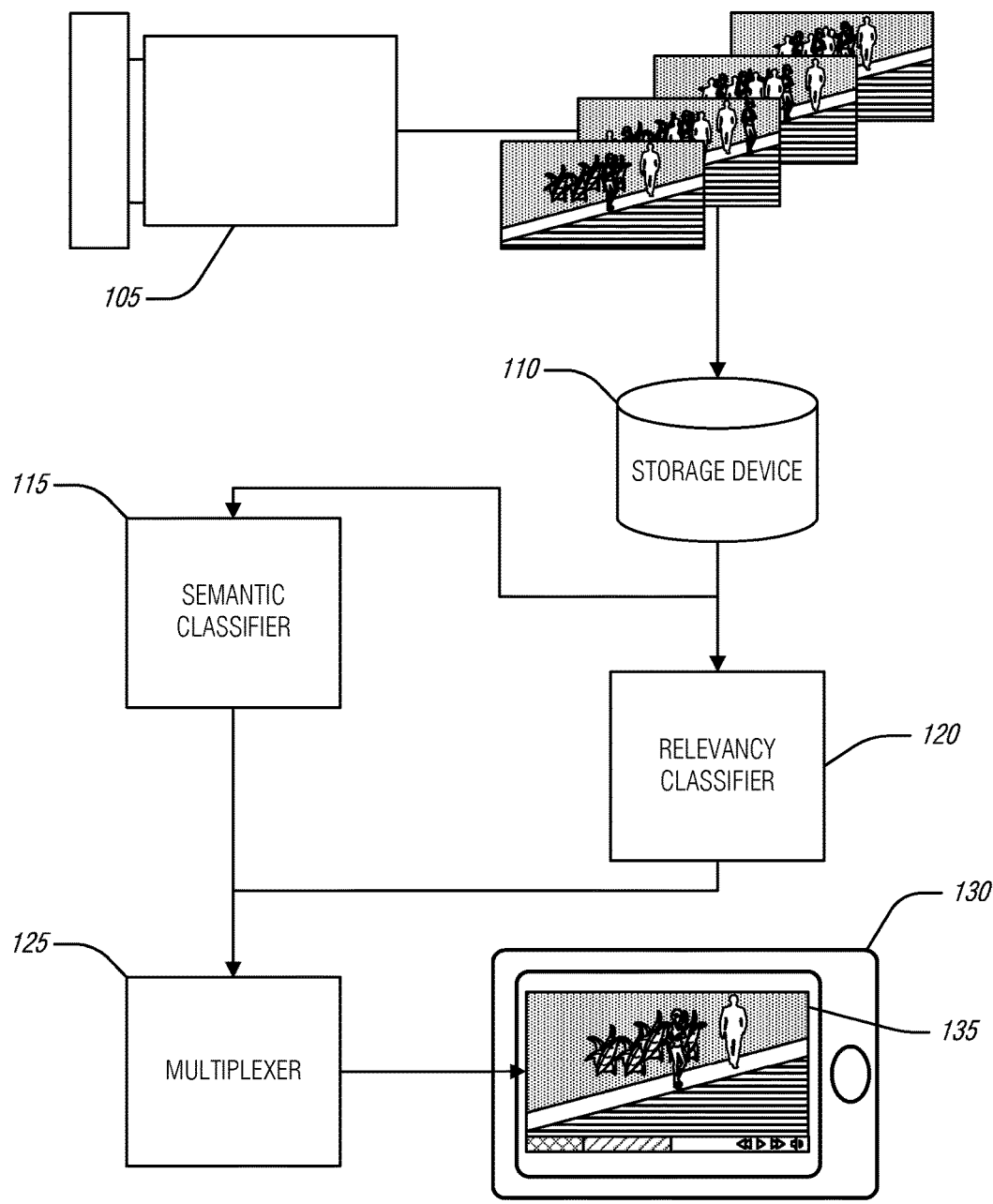
FIG. 1 is a block diagram of an example of an environment including a system for automatic video summarization, according to an embodiment.

Summarizing video is a difficult computer vision issue because it often entails understanding not only what is shown in the video, but also whether it is important. Classifiers are systems (e.g., trained machine learning systems) that are designed to impart semantic context to visual data. Video summarization classifiers are often trained on specific scenarios, such as a pedestrian held camera traversing an urban environment. Generally, these classifiers require a large number of training sets (e.g., videos of people walking in a city) and often significant human feedback (e.g., selecting relevant frames, sub-scenes, etc.) to be useful. However, these classifiers tend to be limited to the specific training sets and techniques used. For example, the previously mentioned urban pedestrian classifier may classify livestock as relevant (an unusual occurrence in most urban environments) and thus classify cattle from video shot on a cattle farm as largely relevant, even though, in this context, the animals are common place.

To complicate the video summarization issues discussed above, sub-scene boundaries are also difficult to detect, or otherwise determine, to existing computer vision systems. That is, without the full scope of human understanding, it is difficult for the machine to know that a hysterical laughing episode lasting three minutes is a sub-scene and a subsequent sub-second sneeze are separate sub-scenes, when each may involve the same subject, same background, same faces, etc. Moreover, with both sub-scene determination and generally video summarization, if the video is shot (e.g., controlled, directed, etc.) by a human, the underlying summarization is subjective. That is, two different people may summarize the same video differently. These issues may be exacerbated when the camera operator is an amateur, or given raw footage, (e.g., casually captured footage) without the benefit of directing, editing, or other techniques that may define sub-scene boundaries.

To address the issues noted above, an automatic video summarization system is described herein. The system generates a semantic model of the video from the information contained within the video itself. Creating the semantic model in this way allows for the intrinsic differences between sub-scenes to define sub-scene boundaries, rather than relying an arbitrary timing, or specially trained classifiers. The system does use classifiers for relevancy ques, but the semantic model permits a much less accurate relevancy classification to be used to produce useful results. Thus, classifiers trained in different environments and scenarios may be used because the results do not depend upon the ultimate objective accuracy of the classifier to what one would consider relevant, but rather on the comparative relevancy within the video. Finally, the system combines the generated semantic model with the imperfect relevancy classification to iteratively generate sub-scenes from the video and thus automatically summarize the video.

FIG. 1 is a block diagram of an example of an environment including a system 100 for automatic video summarization, according to an embodiment. The system 100 may include a camera 105 (to capture the video), a storage device 110 (to buffer or store the video), a semantic classifier 115, a relevancy classifier 120, and a multiplexer 125. All of these components are implemented in electromagnetic hardware, such as circuits (e.g., circuit sets described below), processors, memories, disks, etc. In an example, some or all of these components may be co-located in a single device 130.

The storage device 110 is arranged to hold the video. In an example, the video is delivered to the storage device 110 from the camera 105. In an example, the video is delivered by another entity, such as a mobile phone, personal computer, etc. that obtained access to the video at some point. The storage device 110 provides the store from which other components of the system 100 may retrieve and analyze frames, or other data, of the video.

The semantic classifier 115 is arranged to generate a semantic model of the video from the frames of the video. As used herein, the semantic model is a device by which represents the similarity between frames. In an example, to generate the model, the semantic classifier 115 is arranged to extract features of the frames. In an example, the features are low level features. As used herein, low level features are those aspects of the frame that do not require any semantic understanding. For example, the percent of a frame area that is green does not require understanding what such a feature means, but rather a simple measurement. In general, however, low level features are measurements that have been found to imply semantic information. In contrast to the measurements of low level features, a high level feature may include greater inference from underlying measurements, such as identification of a face, which involves classifying a region by a variety of present shapes and colors.

In an example, the low level features include a GIST descriptor. A GIST descriptor may be computed by convolving a frame with a number of Gabor filters at different scales and orientations to produce a number of feature maps. In an example, there are thirty two Gabor filters, four scales, and eight orientations used to produce thirty two feature maps for the GIST descriptor. These feature maps may then be divided into a number of regions (e.g., sixteen regions or four by four grids) in which the average features values of each region are calculated. Finally, the averaged values may be concatenated (e.g., joined) to produce the GIST descriptor. Other low level feature techniques may be used, such as Hough transforms to identify shapes or lines in the frames, color based measurements, etc. In an example, metadata of the frames may be measured for feature extraction, such as the geographic location of the frame capture. In an example, low level sound features may be used. In an example, Mel-frequency cepstral coefficients (MFCCs) may be employed as low level features. In general, audio cues, such as the presence of loud noise or the absence of noise may contribute to identifying interesting (e.g., relevant) portions of the video.

In an example, the semantic classifier 115 is arranged to extract high level features of the frames. As noted above, high level features involve understanding something of the underlying image data, to, for example, determine a setting (e.g., indoors, outdoors, in a home, in an office, in a theater, in a park, on the ocean, at a beach, in an urban environment, in a rural; environment, on a mountain, etc.), an activity (e.g., playing a sport, swimming, an event such as a concert, work, a party, cooking, sleeping, etc.), or an object (e.g., a landmark, a person, a face, an animal, equipment such as cars, trucks, a hockey stick or other sporting equipment, etc.). In an example, to extract these high level features, the semantic classifier 115 may employ or implement a classifier to identify scene (e.g., multiple frame) characteristics, in an example, the classifier may be implemented using a deep convolution network trained for scene classification.

Once features of the frames are extracted, the semantic classifier 115 organizes the frames in a data structure based on the extracted features. Such organization provides a meaningful way for the model to represent the commonality of frames based on the commonality of the respective features of the frames. In an example, generating the semantic model includes the semantic classifier 115 arranged to generate a pseudo-semantic domain from the extracted frame features. Such a pseudo-semantic domain is an n-dimensional space derived from the found features. For example, if each from were measured on three features, the respective measurements of each feature would be a coordinate in a three dimensional space for the respective frame. A visualization of this is given in FIG. 5 and described below. Generally, the dimensionality of the space is equal to or less than the number of different features for which an attempted extraction was made. Thus, given a thousand feature tests to extract features from the frames, the dimensionality of the pseudo-semantic domain would be a thousand or less. The dimensionality may be reduced when, for example, a feature extraction reveals that the feature is not present in the video. In this example, the dimension corresponding to this feature may be removed from the n-dimensional space, rendering it an (n−1)-dimensional space. For example, if the semantic classifier 115 attempted to extract elephant imagery from the frames, and there is no such imagery, the dimensionality of the pseudo-semantic domain would be reduced to eliminate elephant imagery. Other reduction mechanisms may also be used to, for example, make later computations for efficient. In an example, spectral embedding may be employed by the semantic classifier 115 to reduce the dimensionality.

In an example, the pseudo-semantic domain may be processed and realized by a number of artificial intelligence networks. For example, the extracted features (e.g., those features found in the frames) may be used to train a deep Boltzmann machine, a type of neural network initialized and trained without supervision. A variety of other unsupervised artificial intelligence models may also be used. In an example, however, the pseudo-semantic domain is created, it is created from only the features present in the video's frames and not from an external source. As will be discussed later, this feature scales the differences between the frames to permit sub-scene differentiation across a wider variety of subject videos than current techniques allow. Other example artificial intelligence techniques that may be used include generative models, such as probabilistic graphical models or mixture models.

After the pseudo-semantic domain is created, the semantic classifier 115 maps the individual frames to the pseudo-semantic domain. As noted above, such mapping may include using individual feature extraction values as coordinates for the frames. These values may be normalized so as to function as valid coordinates in the n-dimensional space together. In an example, the normalization not performed, and the raw values are used. In the example of the pseudo-semantic domain built using a network, such as the deep Boltzmann network, mapping the individual frames may simply involve feeding each frame through the network to arrive at the resultant coordinates particular to that frame in the n-dimensional space.

The semantic model is generated when the frames are placed in the n-dimensional metric-space such that distances between the frames in the space are calculable. As a simple example, consider the Euclidean distance metric in a two dimensional space (e.g., the dimensions denoted by x and y), the distance from one point (e.g., frame) to another follows $\sqrt{(x_1-x_2)^2+(y_1-y_2)^2}$=distance between the two points 1 and 2. After the creation of the semantic model, the similarity of any frame to another is the exponential of the negative square distance between the two frames in the n-dimensional space. That is, the closer two frames are, the more similar they are.

In an example, a set of key frames from the mapped frames may be identified. The mapped frames, or points in the n-dimensional space, represent points on a surface of a manifold in the n-dimensional space. It is ultimately this manifold which is the underlying model, however, its exact definition is not necessary to perform the techniques described herein. In fact, a subset of the frames, the key frames, may be used instead. The key frames are single frames that represent a group of frames for a semantic concept. For example, a cluster of frames in the n-dimensional space represent a similar scene. A frame from the cluster may therefore represent the cluster and is this a key frame. A variety of key frame identification techniques may be employed, such as finding a kernel to a cluster. In an example, the key frames may be recursively identified by scoring the frames and successively taking the top scoring frame until a threshold number of key frames are acquired. In an example, the threshold is determined by the length of the video. In an example, the threshold is determined by a number of identified clusters in the n-dimensional space. In an example, where the scoring of frames involves distance between key frames, the threshold is a minimum distance between frames. That is, if the distance between two frames is below the threshold, the recursive search stops.

In an example, the key frames may be scored by distance. Here, identifying frames that are far apart from each other identifies parts of the video that show different things. To score the distance between the frames, a first frame is chosen as the first key frame. In an example, the first frame is chosen based on being the farthest from the origin of the n-dimensional space. A second frame is chosen to be in the set of key frames by choosing the frame that is farthest from the first frame. The third frame chosen is the farthest from both the first frame and the second frame in the set of key frames. As noted above, this may continue until the distance between the nth frame is below a threshold. Thus, the set of key frames is a recursive identifying of key frames by adding a next frame to the set of key frames with the highest score in the set of frames that are mapped. The score of a frame in this example, being the inverse of the sum of a square norm of the coordinate of the frame multiplied by a constant and divided by the square of the norm of the distance between the frames and another frame in the set of key frames for all members of the set of key frames. The following equation illustrates this scoring:

$$\tilde{X}_{R+1} = \underset{X_i}{\mathrm{argmax}} \left[ \sum_{r=1}^{R} \frac{1 + \gamma \|X_i\|^2}{\|X_i - \tilde{X}_r\|^2} \right]^{-1}$$

Where $\tilde{X}$ is the set of key frames, X is the set of mapped frames, and y is a constant controlling the regularization level.

The relevancy classifier 120 may operate independently of the semantic classifier 115, as illustrated in FIG. 1. This independent operation permits parallel processing of the video because the operations of the semantic classifier 115 do not interfere or otherwise impact the operations of the semantic classifier 115. The relevancy classifier 120 is arranged to assign respective relevancy scores to the frames. Such relevancy assignment may include any number of classifiers (e.g., applying a library of classifiers) scoring the frames and being combined to provide a score, or set of scores, for each frame. Example classifiers may involve noting movement (e.g., action as opposed to stillness), the presence of faces, etc. The classifiers may also involve metadata about the video, such as when or where the video was captured. In an example, the metadata is respective to the actions of a camera operator (e.g., behavioral indicators). For example, a time in which the camera was held steady or the use of zoom in a series of frames. Both of these metrics suggest heightened interest by the camera operator that may be used to increase the relevancy of frames for which the camera was held steady, or for which an increased zoom was employed, or both. In fact, as described below, using these camera operator relevancy classifiers alone allows the system to select sub-scenes that more closely align with those selected by the operator than with other sub-scenes selected by other people. In an example, the combination of behavioral indicators and other classifiers may be separately determined and combined to create a composite relevancy score for the frames.

As noted above, the system 100 combines the semantic model with these relevancy scores to select sub-scenes, permitting a less accurate relevancy score to be used effectively. Accordingly, in an example, relevancy classifiers may be filtered to limit the applied relevancy classifiers (e.g., those that contribute to the relevancy score) to those with a greater than fifty percent chance of indicating relevancy (e.g., better than a random result). In an example, the filtering is limited to behavioral indicators.

In an example, the library of classifiers is amended based on user feedback. For example, a selected sub-scene may be presented to the user. The user may indicate that the sub-scene is not desired for the video summarization. The relevancy classifiers that contributed to the sub-scene's selection may be removed from future classifications, or may be modified (e.g., weighted) to have a smaller impact on additional relevancy scoring.

After the semantic classifier 115 creates the semantic model and the relevancy classifier 120 assigns relevancy scores to the video's frames, the multiplexer 125 is arranged to take these two inputs and produces a set of sub-scenes that summarize the video. In an example, the multiplexer 125 is arranged to initialize the semantic model with the respective relevancy scores and iteratively process the model to produce the set of sub-scenes. In an example, each iteration of sub-scene selection includes converging the model following initialization, selecting a sequence of frames with the highest relevancy score after convergence, and re-initializing the model by fixing (e.g., clamping, anchoring, etc.) the relevancy scores for the sequence of frames selected in this iteration. This process continues until a predetermined number of sub-scenes are identified, or until a quality threshold is reached. At the end of the iterative processing, the sub-scenes may be combined, or otherwise presented (e.g., via a file format, user interface, etc.) to the user as the summarized video.

In an example, to initialize the model, the multiplexer 125 is arranged to construct a graph in which nodes correspond to the frames of the video and edges are weighted to the exponent of the negative square distance between frames in the semantic model. Thus, the closer the frames are in the semantic model, the greater the weight of edges connecting the frames. The value of the nodes is the corresponding relevancy score for the frame. In an example, edges are omitted (e.g., never placed in the graph) or removed when a distance between two frames is beyond a threshold. That is, if two frames are far enough removed, no edge will remain to connect the corresponding nodes of these frames in the graph. Such edge reduction may increase computational efficiency in converging the model by reducing the number of calculations at each iteration. In an example, the minimum distance is determined such that the graph is fully connected (e.g., there exists a sequence of edges such that each node can reach each other node).

In an example, to initialize the model, the multiplexer 125 is arranged to fix a subset of nodes. In an example, the subset of nodes includes those with a high (e.g., greater than the median, average, or mean) respective relevancy and those with a low (e.g., less than the median, average, or mean) respective relevancy. In an example, the subset of nodes consists of (e.g., only has) key frames. In an example, all of the key frames are fixed and make up the entirety of the subset of nodes. In an example, the subset of key frames includes a single key frame with the highest relevancy score and a single key frame with the lowest relevancy score.

In an example, to converge the model, the multiplexer 125 is arranged to calculate node values for nodes that are not in the subset of nodes. That is, every node that is not fixed has a value that is ultimately unknown prior to convergence. Thus, each node is updated at each iteration of convergence. The calculation is based on the values of neighboring (e.g., connected by a single edge) nodes. In an example, the calculation proceeds via a message passing algorithm between nodes along their edges. In an example, at each iteration of convergence, a node's value is set to be the weighted average of neighboring nodes. Thus, the value of the neighboring node is modified (e.g., multiplied) by the edge weight and summed with other neighboring node's weighted values and ultimately divided the number of neighboring nodes. The convergence iterations continue until a convergence threshold is reached.

In an example, the convergence threshold defines a rate of change in node values below which convergence is considered reached. Thus, if initial iterations resulted in great change to node values, successive changes that are proportionately much smaller indicate converge is achieved. This type of scaled measure may help to dynamically address different semantic models (e.g., between video with a lot of change and those with little overall change in their contents throughout the video). In an example, the convergence threshold is an absolute value. That is, as soon as the greatest change in a node in an iteration falls below the threshold, convergence is achieved.

When the model has high fixed values and low fixed values for nodes, the convergence process causes unfixed nodes close to the high fixed values to move towards those values and other unfixed nodes close to the low fixed values to move towards those nodes. Thus, the semantic closeness of the frames, as represented in the semantic model, intrinsically selects sub-scene boundaries.

Figure 8:
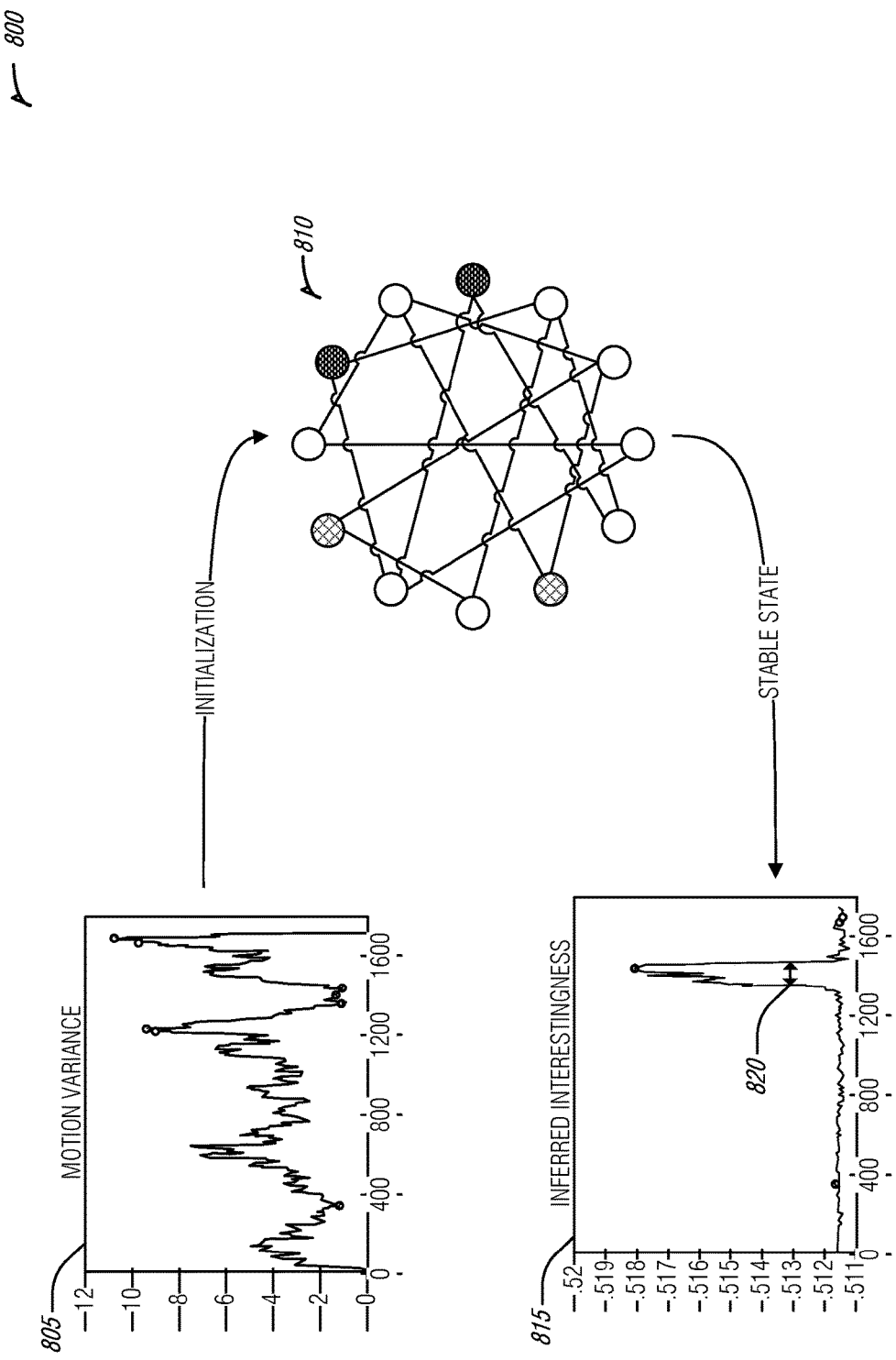
FIG. 8 illustrates a visualization of producing sub-scenes using the semantic model and assigned relevancy scores, according to an embodiment.

Generally, the unfixed nodes will generally gravitate to a bimodal distribution, as shown in FIG. 8 and described below. Thus, selecting a sub-scene during a given multiplexer 125 iteration involves selecting a continuous sequence of frames that are relevant enough and include the high relevancy key frame. Relevant enough, in this context, is a thresholding issue that is determined based on the distribution of resultant node values. As illustrated in element 815 or FIG. 8, one simply determines a value corresponding to the low scoring nodes and takes the frames corresponding to nodes with a greater value than that determined value. Thus, in an example, to select the sequence of frames with the highest relevancy score after converging includes the multiplexer 125 arranged to select frames with corresponding nodes having a value greater than the selection threshold. In an example, the selection threshold is determined from the entirety of node values. In an example, the selection threshold is the average of the nodes values.

In an example, to re-initialize the model at each iteration may include the multiplexer 125 fixing the node values (e.g., relevancy scores) of the nodes selected for the sub-scene. Thus, on the following iteration, the same sub-scene will not be selected. In an example, these nodes are fixed to a low relevancy. In an example, the low relevancy is a relevancy floor (e.g., the lowest relevancy). By doing so, the next most relevant sub-scene will be selected in the subsequent iteration. Moreover, the subsequent sub-scene will be as semantically different to the selected sub-scene as possible. Thus, the series of sub-scenes will not only embody the most relevant portions of the video, but will also avoid redundant sub-scenes. In an example, the previously selected nodes will be fixed to a high relevancy. In an example, the high relevancy is a relevancy ceiling (e.g., the highest relevancy). Such a setting, such as via the user interface 135, described below, allows the user to request more of the same in sub-scene selection. It is understood, however, that the same nodes that were previously selected will not be selected on subsequent sub-scene selection iterations. In an example, the nodes may be fixed at an indifferent relevancy that is between low relevancy and high relevancy. In an example, the indifferent relevancy level is at least one of a mean or median of the relevancy values of the nodes. This setting minimizes the effect of the previously selected sub-scene such that it neither encourages similar or different subsequent sub-scenes.

The total number of sub-scenes produced may get set in a number of ways. In an example, the number of sub-scenes is based on the length of the video. In an example, the number of sub-scenes is based on the number of clusters in the semantic model. In an example, the number of sub-scenes is based on a user set value. In an example, if a sub-scene is de-selected (e.g., removed, deleted, etc.) by a user, an additional sub-scene may be produced to fill its place.

In an example, as each sub-scene is selected, a clip of the sub-scene is created. Creating the clip may involve simply identifying the frames that are part of the clip. In an example, creating the clip includes copying the sequence of frames to create the clip. In an example, the system 100 includes a user interface 135 in which the sub-scenes (e.g., clips) are presented. In an example, the sub-scenes are presented in the order in which they were produced. In this example, the order of production is also the order of importance of the sub-scenes in summarizing the video. In an example, the user interface 135 may be arranged to receive a discard selection from the user with respect to a sub-scene. The discarded sub-scene is then removed from the ultimate video summarization. As noted above, such user involvement in correcting the output of the system 100 may be used by the system to adjust the relevancy scoring mechanism.

The operation of the system 100 as described above automatically summarizes a video into a number of sub-scene clips. By using the mechanisms described, the system 100 does not need highly accurate or contextual relevancy classifiers as some existing systems require. Rather, the system 100 using intrinsic semantic information and relative relevancy values between frames to effectively summarize video without human involvement.

Moreover, when behavioral indicators of the camera operator are used in the relevancy scoring process, the results produced by the system 100 surpass those of strangers when compared with the outcome desired by the camera operator. This was experimentally verified over ten video clips using five different camera operators. In the experiments, a simple version of the system 100 was used and compared to a reference, non-trained, human performance. The relevancy score was determined using only the variance in the pseudo-semantic domain. Precision/recall was compared and F1 score (information retrieval) of the system's 100 summarization against humans that were not the camera operator. When compared with the reference humans, the system's 100 had a better conformance to the camera operator's sub-scene selections in seven of the videos, was statistically equal in one video, and worse in two videos. It was also shown that the system's 100 performance was superior to a random selection (over 100,000 experiments) of sub-scenes and other fixed selection methods (e.g., selecting temporally central/first/last sub-scenes). Thus, the system 100 unexpectedly performs better than a random human in summarizing a camera operator's video to the satisfaction of that operator.

Figure 2:
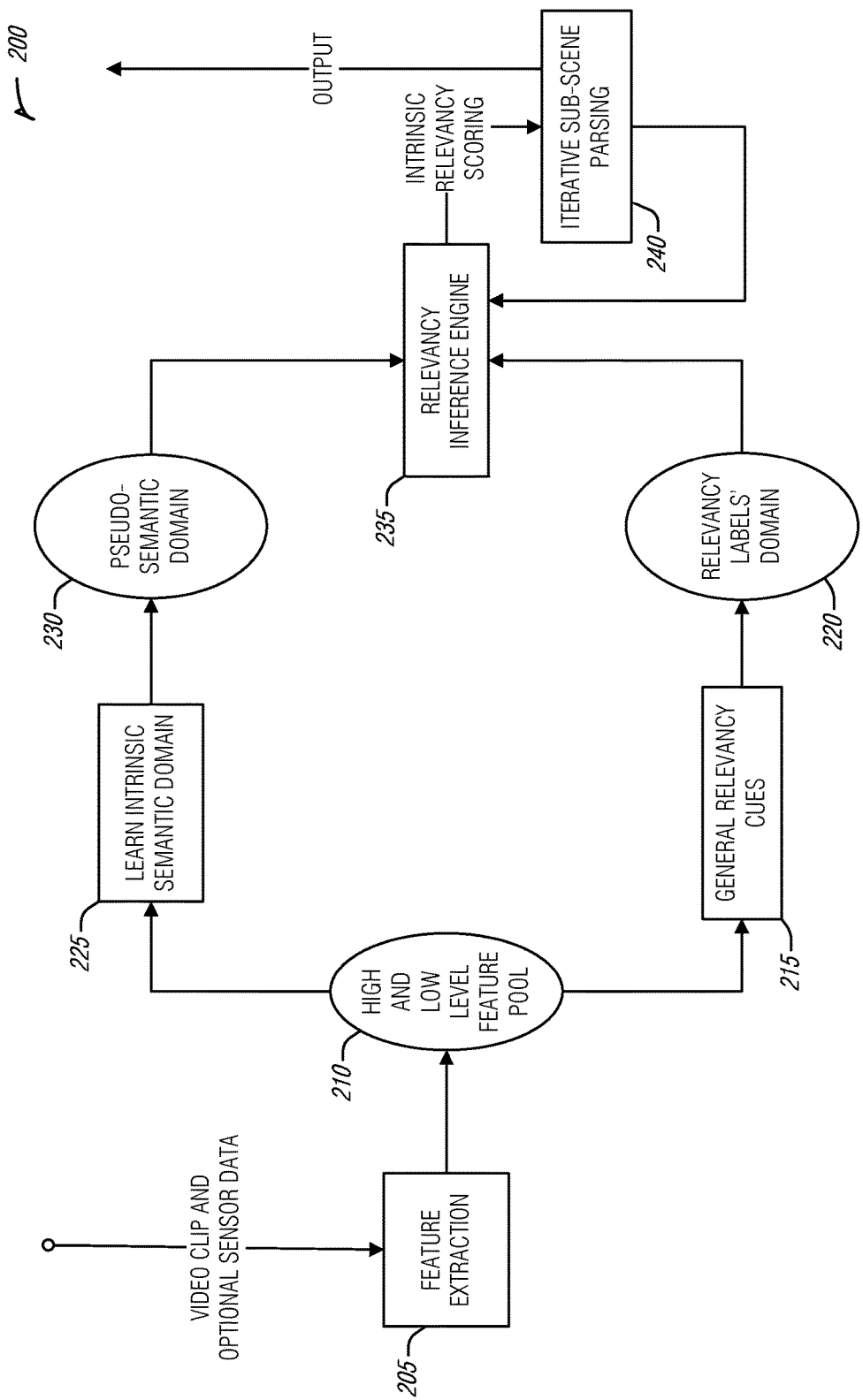
FIG. 2 illustrates a block diagram of an example of a communications flow for a system for automatic video summarization, according to an embodiment.

FIG. 2 illustrates a block diagram of an example of a communications flow for a system 200 for automatic video summarization, according to an embodiment. The communications flow illustrated in FIG. 2 is an overview of various components to implement automatic video summarization. The components of the system 200 are implemented in by a machine.

At component 205 the video data (e.g., frames) and optional sensor data (e.g., accelerometer data to determine whether the camera is moving, etc.) is obtained. The component 205 is arranged to extract features of the frames, for example, as discussed above. The extracted (e.g., found) features are placed in a pool 210 of extracted features.

At component 225, the system 200 learns the intrinsic semantic domain. Thus, the component 225 operates such that the video itself (the one being summarized) is the complete domain. That is, the component 225 operates as if the video contains all the needed semantic information (intrinsically), and creates (e.g., learns, trains, etc.) a generative model for the video's content (e.g., implements machine learning). This will result in sub-scene parsing where the system 200 learns only from the video what are distinct sub-scenes. The component 225 then produces a pseudo-semantic domain 230 as output.

In an example, the pseudo-semantic domain 230 may be re-used in other contexts. For example, context information such as location, time (e.g., time of day, a holiday, etc.), and environmental conditions (e.g., indoor/outdoor recognition) may be incorporated into the pseudo-semantic domain 230 to reuse (e.g., refine) the pseudo-semantic domain 230 previously generated from videos taken under the same (or similar) context, possibly by different users (e.g., camera operators). Such pseudo-semantic domain improvement generally does not interfere with the system's 200 ability to summarize the video according to the specific user's preference, as this is accomplished after this stage.

At component 215, the system 200 looks for general relevancy cues in the video frames. As described above, this may include scoring the frames. In an example, the component 215 identifies and employs the camera operator's own behavior as a cue for sub-scene relevancy (e.g., interestingness, importance, etc.). Predefining a list of camera-man behaviors is significantly simpler than predefining a list of video content descriptions, allowing the system 200 to operate with much less preliminary setup than other systems. This behavioral relevancy may be used in addition other relevancy identifiers, such as object, face, human, action or scene recognition algorithms. The output of the component 215 are the relevancy labels' domain 220 (e.g., relevancy scores applied to frames).

The relevancy inference engine 235 multiplexes the pseudo-semantic domain 230 and the relevancy labels' domain 220 as inputs and produces the summarized video as an output. Thus, the relevancy inference engine 235 fuses the semantic information with the general relevancy cues. The relevancy inference engine 235 applies transductive learning on the semantic model produced from the intrinsic semantic information and initializes it with the general relevancy cues. The initialized model is then iteratively converged. After convergence, the model provides intrinsic relevancy scores for the various parts of the video. Temporal smoothness is obtained implicitly, as well as relevancy-aware sub-scene boundary detection as illustrated in element 815 of FIG. 8.

The relevancy inference engine 235 repeats the model initialization and model convergence to iteratively extract sub-scenes with decreasing relevancy. This may be accomplished via the component 240. At each model convergence, the component 240 "learns" the relative relevancy (e.g., intrinsic relevancy) of video segments. The component 240 then extracts sub-scenes from the video in a decreasing relevancy order. For example, once the most important sub-scene is identified, it is fed back into the inference engine as having low relevancy (or alternatively removes/masks it). When the model is again converged, the next most relevant sub-scene is revealed. In an example, the iterative process allows the user, or an automatic procedure, to stop at any time, allowing control over summarization compression rate (e.g., how many clips will be used for the summarization). As noted, the most relevant sub-scenes are identified first. Subsequent identified sub-scenes have lower relevancy/interestingness/importance to previously identified sub-scenes. The summarized video is the output of the system 200.

In an example, the system 200 employs a user interface to present identified sub-scenes and accept user input. The user interface may provide an additional feature to the system 200 of allowing the user to manually select the relevant sub-scenes from a relevancy-wise ordered list (similar to a search engine result list, or a decision-support system). Since the operation of the component 240 is iterative, this list can be grown on-the-fly, in real-time. Moreover, in case a video's fully-automatic summarization differs from a semiautomatic summarization (e.g., including human input), the system 200 can update its semantic model (online and active learning schemes) to incorporate the user's feedback by adjusting the relevancy cues (e.g., relevancy label's domain 220) or intrinsic model (e.g., pseudo-semantic domain 230).

Figure 3:
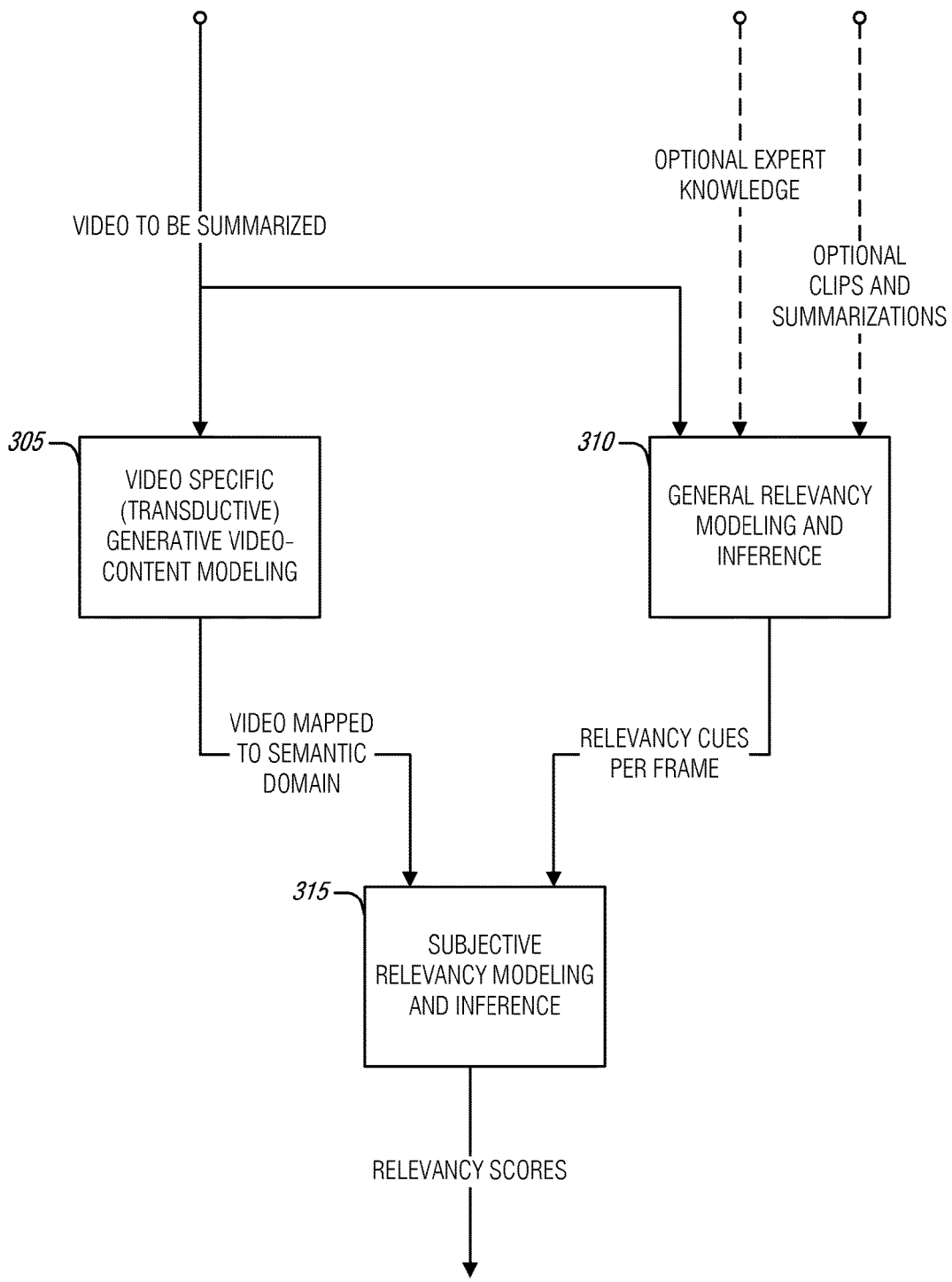
FIG. 3 illustrates a block diagram of an example of a communications flow for a system for automatic video summarization, according to an embodiment.

FIG. 3 illustrates a block diagram of an example of a communications flow for a system 300 for automatic video summarization, according to an embodiment. FIGS. 3-4 and 6-7 provide details of the system 300. FIG. 3 provides an overview of various components and the remaining FIGS. Described the sub-components of these components. All of the components and sub-components discussed are implemented by machines as described throughout this document.

Component 305 learns an intrinsic pseudo-semantic domain for the video using an unsupervised learning mechanism. The component 305 also learns a generative model for the clip in this pseudo-semantic domain (e.g., by identifying key-frames for all sub-scenes).

Component 310 scores the video frames with respect to general relevancy (i.e., importance or interestingness of the individual frames). This score serves as initial evidence of relevancy and uses either hard-coded (expert knowledge) or previously learned rules (e.g., by feeding the system with videos and their manual summarizations). These rules need not be very accurate, however, due to the later combination of the pseudo-semantic domain and the general relevancy modeling, but should be better than a random guess (e.g., accuracy >0.5). Component 310's output uses the relative, not absolute, scoring of different video parts. That is, the general relevancy scores are scaled such that there is a maximum and minimum relevancy score within the population of frames.

The component 315 generates a model for inferring the relevancy of a sub-scene given the initial relevancy scores from component 310 and the semantic domain from component 305. The inference is may be a semi-supervised learning algorithm with soft labels (e.g., evidence from component 310 or previous iterations).

Figure 4:
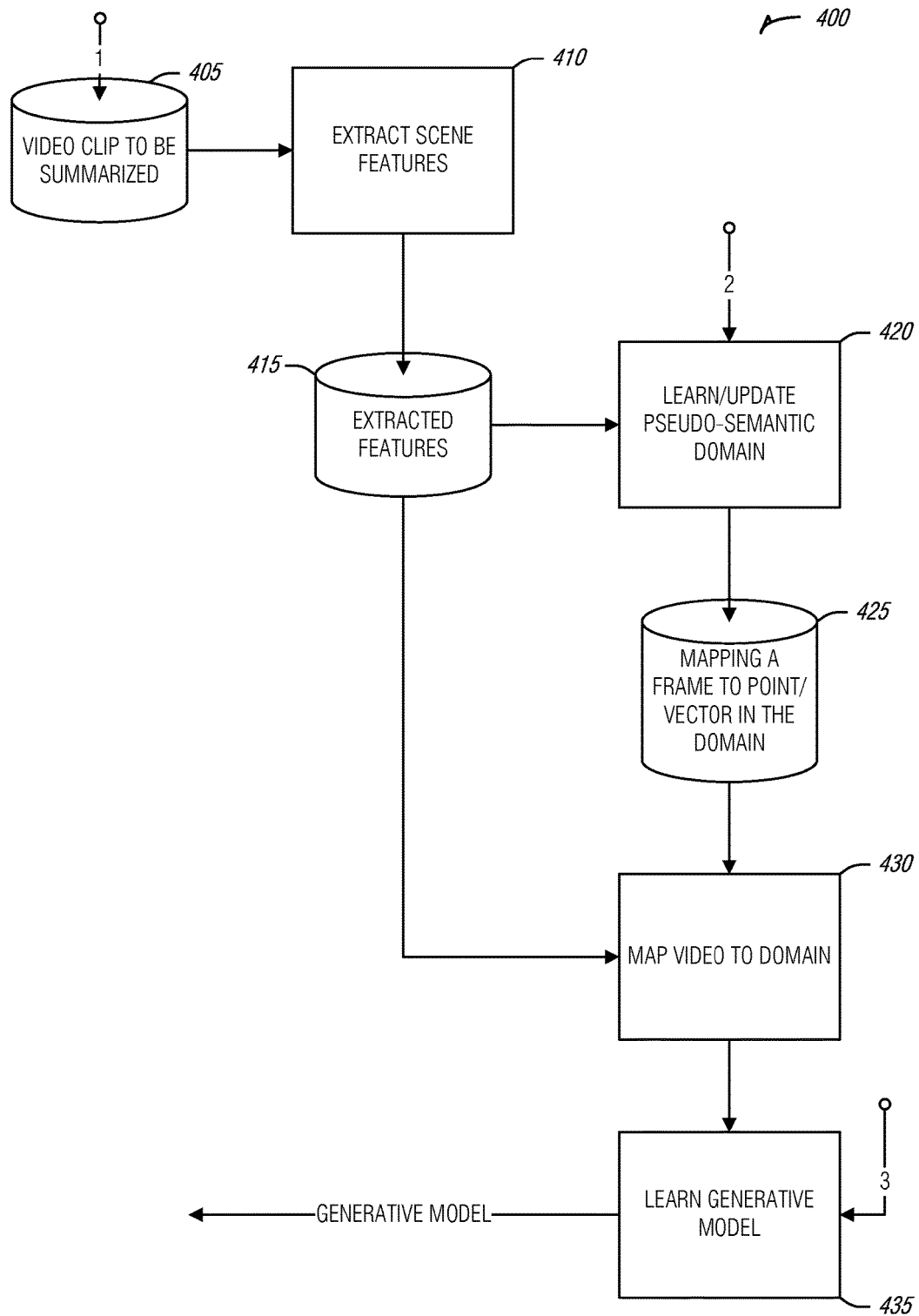
FIG. 4 illustrates an example of a system communications flow for generating a semantic model, according to an embodiment.

FIG. 4 illustrates an example of a system communications flow 400 for generating a semantic model, according to an embodiment. The system 400 is an example implementation of the component 305 discussed above.

The video to be summarized is placed in a storage device 405. Scene features are extracted by component 410. These features are common features used to classify between scene types (e.g., indoor/outdoor, beach/sunset/party, etc.). Example features may include GIST descriptors or output of the first layers of a deep convolution network trained for scene classification. The extracted features may be placed in the storage device 415 for use by other components.

The component 420 learns a pseudo-semantic domain. This is done using an unsupervised learning algorithm, such as training a deep Boltzmann machine, spectral embedding, an auto-encoder, sparse filtering, etc. The "semantics" naturally arise from the type of features used. The unsupervised learning algorithm reduces noise while maintaining semantic interpretation. Thus, two frames that have similar "semantic" information with respect to other video frames (e.g., transductive inference) are mapped to points with small distance between them with respect to mappings of other video frames. The optional input 2 allows for crowdsourcing by using semantic domains from videos captured under the same or similar context (e.g., preferences of the camera operator, time, place, event, etc.).

The storage device 425 contains the pseudo-semantic model (e.g., learned domain) that will be used to map the video to the domain. The component 430 maps the video frames the learned domain. If a deep Boltzmann machine was used to produce the learned domain, mapping involves feed-forwarding the frames through the Boltzmann machine. In the case where spectral embedding was used, out-of-sample extension techniques may be used to perform the mapping.

The component 435 learns a generative model (e.g., probabilistic graphical model, mixture model, etc.) for the mapped video. That is, the component 435 learns a model that is assumed to "generate" the video frames. In the system 400, the component 435 identifies key frames—e.g., a set of frames that are spread on the manifold created by the mapped video. In an example, the component 435 uses a recursive procedure in which a frame having the highest score is added to the key-frame set:

$$\tilde{X}_{R+1} = \underset{X_i}{\operatorname{argmax}} \left[ \sum_{r=1}^{R} \frac{1 + \gamma \|X_i\|^2}{\|X_i - \tilde{X}_r\|^2} \right]^{-1}$$

where $\tilde{X}$ is the set of key frames, X is the set of mapped frames, and y is a constant controlling regularization. The input 3 to the component 435 is an optional input in which data from other videos with the same or similar context may be used to, for example, identify the key frames. The output of component 435 is the generative model that, when queried, provides a semantic-similarity metric with regard to frames in the video (e.g., a measure of how semantically similar two frames are).

Figure 5:
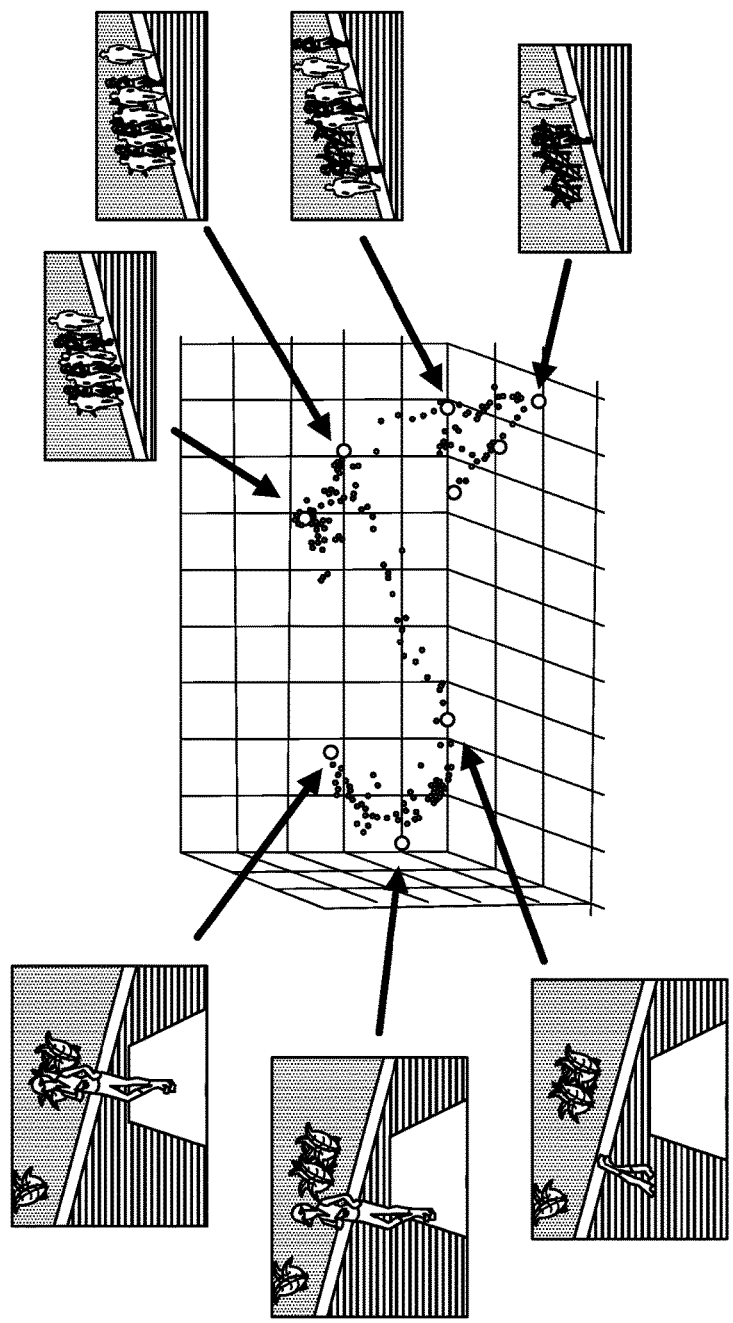
FIG. 5 illustrates an example of a semantic model visualization, according to an embodiment.

FIG. 5 illustrates an example of a semantic model visualization 500, according to an embodiment. As variously described above, the semantic model or pseudo-semantic domain may be an n-dimensional space in which dimensions correspond to extracted frame features. For simplicity, the visualization 500 illustrates a three dimensional space. The small black dots represent frames of the video mapped to the domain. The larger whit dots represent selected key frames. Note that the proximity of the frames on the left with each other is greater than those on the right of the visualization 500. As illustrated, for example, the woman in the scenes on the left is jumping into the water, and thus are clustered compared to the people running along the pool in the scenes on the right.

As described above, the distance between the points measures the similarity of the frames that correspond to those points. In selecting key frames, as described above with respect to FIG. 4, an initial frame is selected, perhaps that which is farthest away from the origin in the space. The next frame selected is that which is farthest away from the first scene. Subsequent frames are those that are farthest away from all of the previously selected key frames. Thus, the mapped frames provide a transductive inference of a manifold in the space that models the semantic relations between frames. The key frames are a model of the manifold, and are later used to generate the manifold for new inputs.

Figure 6:
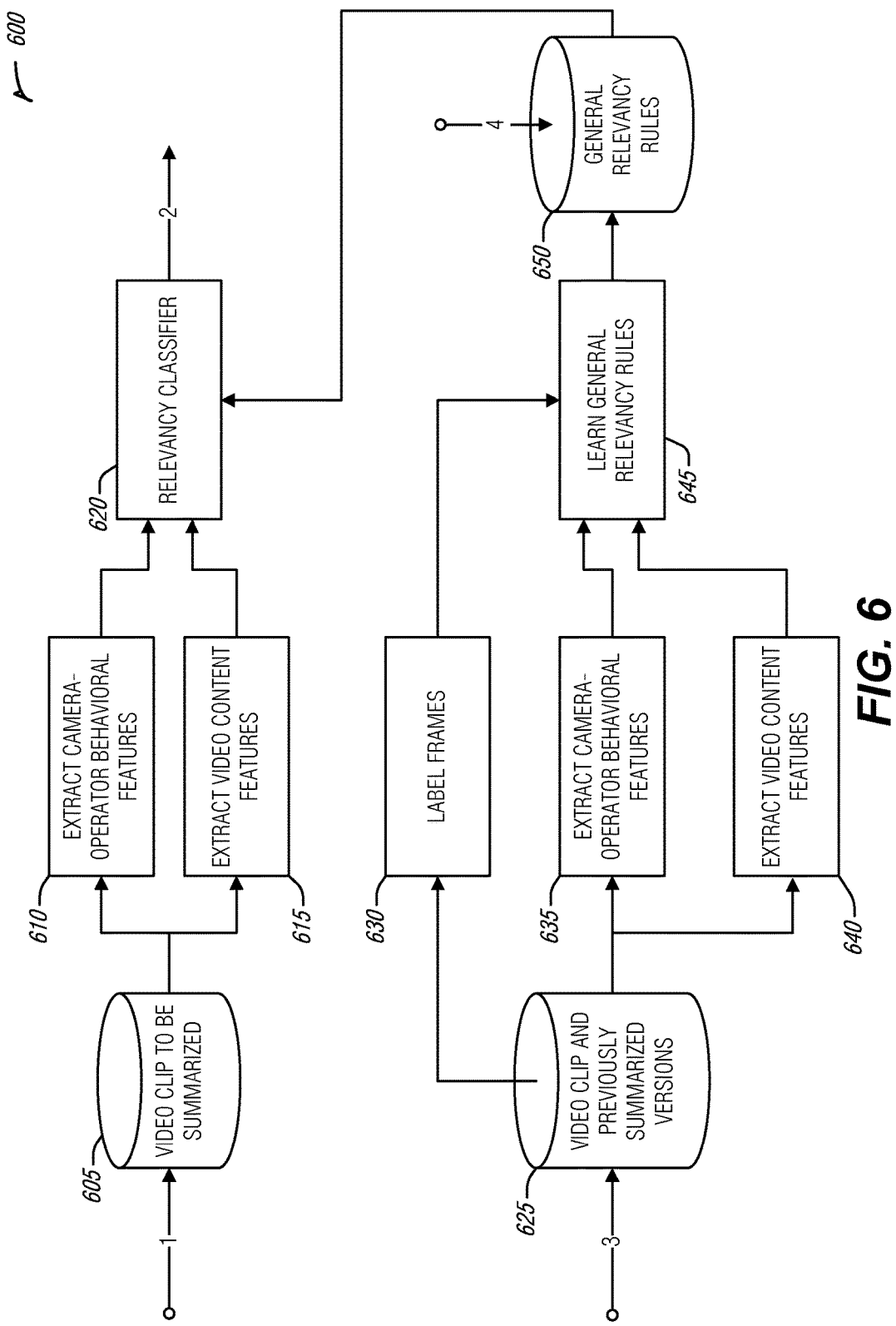
FIG. 6 illustrates an example of a system communications flow for assigning relevancy scores to frames, according to an embodiment.

FIG. 6 illustrates an example of a system communications flow 600 for assigning relevancy scores to frames, according to an embodiment. The system 600 is an example implementation of the component 310 discussed above. The system 300 learns/applies general relevancy rules (e.g., having classification accuracy >0.5). These rules can be either learned from previously (manually or semi-automatically) summarized videos or be directly added by a human expert (e.g., programmer). The system 600 identifies frames in the video that have a relatively high relevance score using global rules.

Storage devices 605 and 625 store the video to be summarized. The storage device 625 may also include previously summarized sub-scenes and attendant relevancy information, e.g., via input 3 as opposed to the simple video of input 1.

Components 610 and 635 operate in the same manner. Components 615 and 640 also operate in the same manner. The primary difference between the two illustrated flows is the frame labeling of component 630 and the general relevancy rule learning of component 645 that may include feed-back information from a user via the additional sub-scene information of storage device 625.

At component 610 the camera operator's behavior is extracted using features such as the standard deviation of camera motion, or by detecting zooming (e.g., in or out). This provides cues on the relevancy of the scene being captured from the camera operator's point of view. For example, if the camera shake is low, or there is a zoom-in action, one may infer (e.g., with greater than fifty percent accuracy) that there is something interesting happening in the scene in the opinion of the camera operator (e.g., the relevancy classifier 620 should classify these frames as relevant). In an example, content features (e.g., as extracted by component 615), such as facial recognition, may also serve as cues for relevancy for the relevancy classifier 620.

The general relevancy rules 650 can be either provided externally (e.g., via input 4) or learned from previously manually/semi-automatically summarized videos (e.g., via a user interface via input 3). In the latter case the same features of the camera operator's behavior (e.g., component 653) and content features (e.g., component 640) are extracted. By marking which frames were included in the previous summarization and which were not—e.g., via frame labeling by component 630, such as labeling each frame in the full video as irrelevant if it is not in the summarization or relevant otherwise—supervision may be used for learning or supplementing general classification rules 650 with common supervised learning algorithms such as a support vector machine, deep neural networks etc. by the relevancy classifier 620. The output 2 is the relevancy classifications (e.g., scores) of the video frames.

Figure 7:
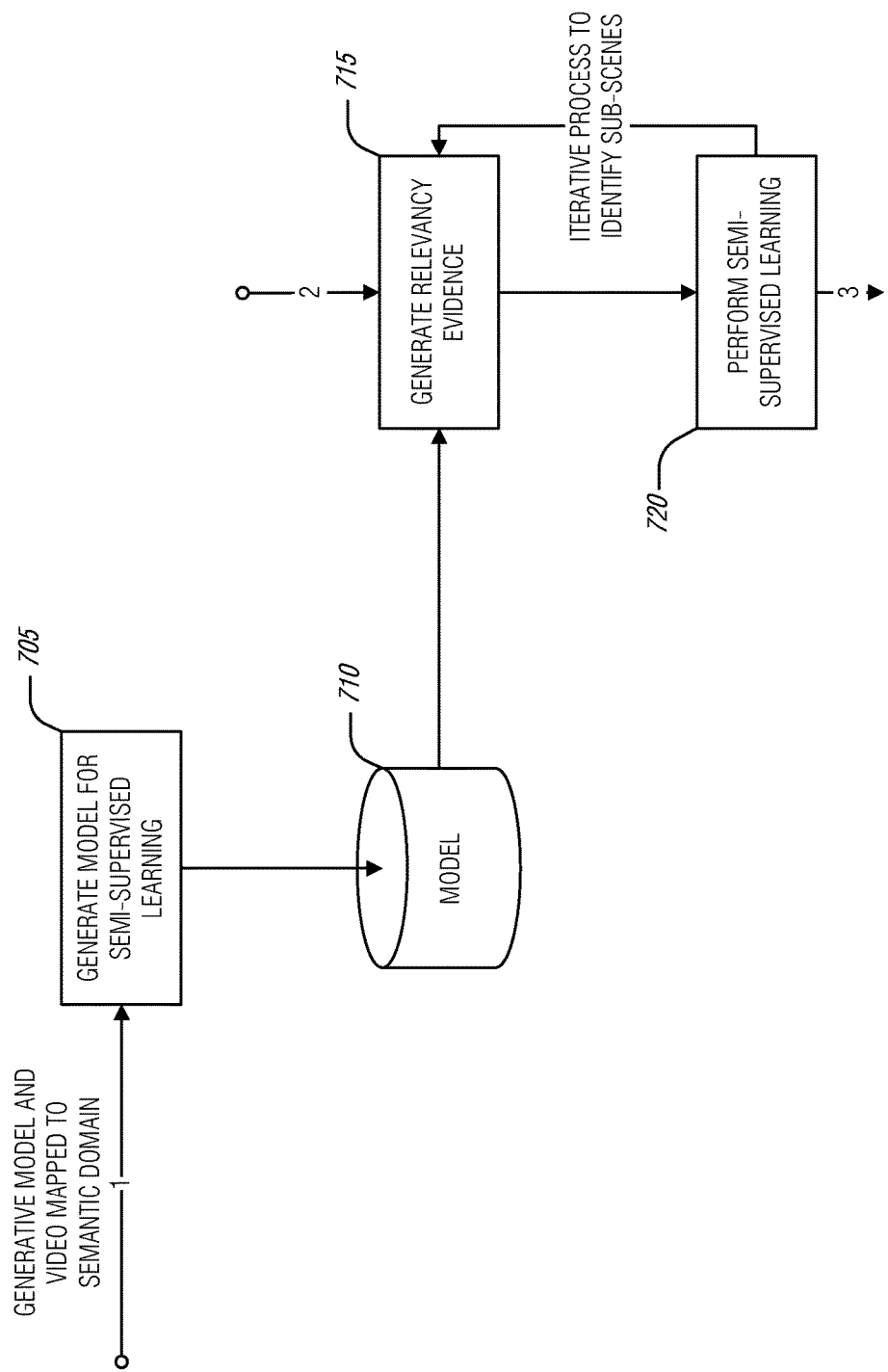
FIG. 7 illustrates an example of a system communications flow for producing sub-scenes using the semantic model and assigned relevancy scores, according to an embodiment.

FIG. 7 illustrates an example of a system communications flow 700 for producing sub-scenes using the semantic model and assigned relevancy scores, according to an embodiment. The system 700 is an example implementation of the component 315 discussed above.

Component 705 uses the mapped video clip from system 400 (e.g., via input 1) and generates a model 710 for semi-supervised learning. In an example, the model is a graph whose nodes correspond to frames and whose edges correspond to similarity in the pseudo-semantic domain (e.g., edges are weighted with the inverse distance between points in the n-dimensional space).

The component 715 is initialized with available relevancy evidence (e.g., from system 600 or from previous iterations) via input 2. In an example, component 715 selects the most confident evidence (e.g., key-frames having highest and lowest relevancy scores) and fixes (e.g., clamps) the state of the corresponding nodes (frames) in the graph. The remaining nodes are not fixed and treated as hidden variables whose their states will be later determined (e.g., inferred).

Inferring the state of the hidden variables, e.g., by the component 720, may be done using a message passing mechanism, such as iterative label-propagation. Iterative label-propagation involves, in each iteration, the state of each node being set to be the weighted average of its neighbors in the graph. Once converged, the frames having the highest and lowest relevancy scores are regarded as evidence and are used to re-initialize the graph (e.g., communicated from component 720 back to component 715).

FIG. 8 illustrates a visualization 800 of producing sub-scenes using the semantic model and assigned relevancy scores, according to an embodiment. The visualization 800 illustrates two plots: the initialization data 805 where camera motion variance is the y axis and frame numbers (e.g., the ordered number of each frame) is the x axis; and a converged relevancy plot 815 where the x access is again the frame numbers and the y axis is the inferred interestingness. The plot 815 is following convergence of the model 810. As noted above, the key frames (e.g., the larger circle in the plot 815) have pulled the remaining nodes to a high state (e.g., the peak with the key frame at its summit) and a low state (e.g., the remaining frames composing the plateau). Also, as evidenced by the plot 815, the sub-scene selection is straightforward, being a thresholding of the relevancy scores to arrive at the sub-scene interval 820. That is, by determining a maximum for the plateau, and taking any frames above that maximum as the sub-scene, the sub-scene boundary is determined.

Again, the plot 805 is the motion variance of the camera operator (y axis) in each frame (x axis); here, low motion implies higher relevancy. The unshaded and shaded circles in the plot are selected key-frames respectively fixed with low and high relevancy scores. Iterative message passing is applied to the graph 810 (the darkly and lightly shaded nodes being fixed key frames) in which messages are passed on edges connecting the nodes. After convergence, on the plot 815, the relevancy score (y axis) of the nodes (x axis) is shown.

In an example, once converged, the highest scoring video segment (e.g., sub-scene) is added to the summarized clip buffer and also set as low relevancy evidence to re-initialize the graph 810. Thus, subsequent video segments may gain highest relevancy scoring and be detected without being masked by the already discovered most relevant video segments. For example, for iteratively identifying relevant sub-scenes after the initial graph 810 converges, a segment is added to the summarized video. Next, this segment is added as low relevancy evidence for re-initializing the graph for the next iteration. The graph 810 is again converged and a second most relevant segment identified and added to the video summarization.

Figure 9:
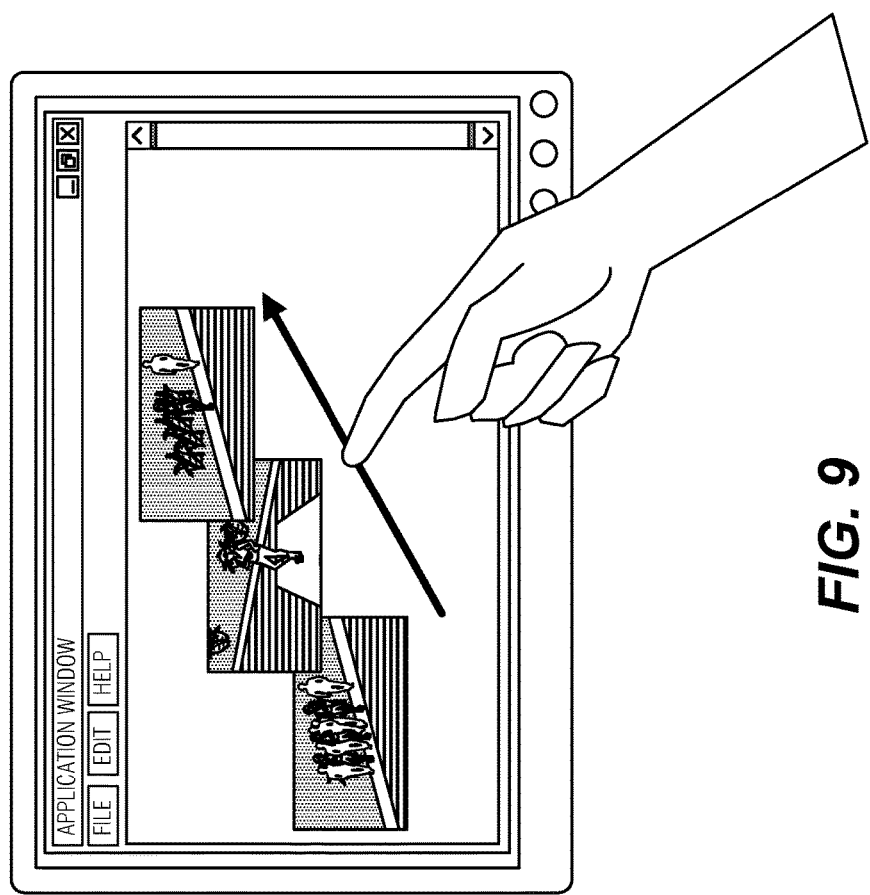
FIG. 9 illustrates a user interface to support supervised learning for sub-scene selection, according to an embodiment.

FIG. 9 illustrates a user interface 900 to support supervised learning for sub-scene selection, according to an embodiment. The unique capabilities for video summarization of the systems discussed above allow for an intuitive user interface to most review or edit sub-scene inclusion in the summarization, as well as for providing some feedback to facilitate supervised learning of the relevancy cues or semantic modeling. For example, when user intervention is requested (e.g., decision-support system mode of operation, the user interface 900 may be employed. If the user is not satisfied with the fully automatic summarization result, particular sub-scenes may be removed, or re-ordered to be less prominent in the summary. The user interface 900 illustrates search-engine-like interface, where presented sub-scenes are ordered in decreasing relevancy (as detected automatically). The user can slide with her finger up or down on the screen to browse sub-scenes. If, for example, the user browses beyond an end of the sub-scenes already generated, the system may produce additional sub-scenes to populate the menu (e.g., by activating the feedback from component 720 to component 715. The user may also select which presented sub-scenes to include, or not to include, in the summary by sliding her finger, for example, to the left and the right respectively.

Figure 10:
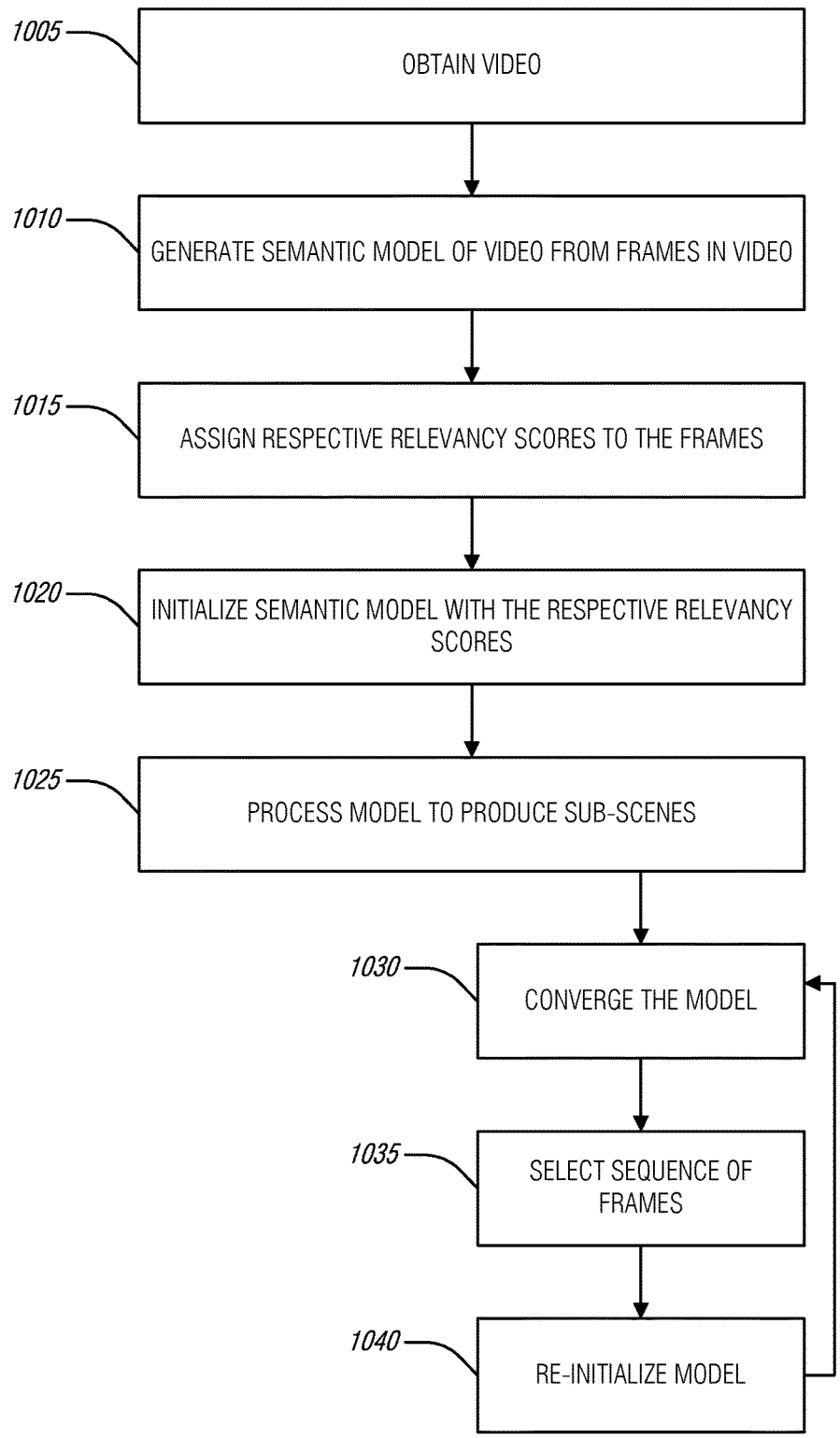
FIG. 10 illustrates an example of a method for automatic video summarization, according to an embodiment.

FIG. 10 illustrates an example of a method 1000 for automatic video summarization, according to an embodiment. The operations of the method 1000 are performed by a machine (e.g., computer hardware) such as that described above, or below (e.g., implemented by circuit sets).

At operation 1005, a video may be obtained (e.g., received or retrieved). The video including frames that make up the video.

At operation 1010, a semantic model of the video may be generated from the frames of the video. In an example, generating the semantic model includes extracting features of the frames. In an example, extracting the features includes finding low level features. In an example, the low level features include a GIST descriptor. In an example, the low level features include location.

In an example, extracting the features includes finding high level features. In an example, finding the high level features include applying a classifier to the frames to identify scene characteristics. In an example, applying the classifier include using a deep convolution network trained for scene classification. In an example, the scene characteristics include one or more of a setting, an activity, or an object. In an example, the setting is one of indoors, outdoors, at a beach, in a forest, or in an urban environment. In an example, the activity is one of a party, a sport, an event, or work. In an example, the object is at least one of a face, an animal, a landmark, or sporting equipment.

In an example, generating the semantic model includes generating a pseudo-semantic domain from the extracted features, wherein the pseudo-semantic domain is an n-dimensional space derived from the features. In an example, generating the pseudo-semantic domain from the extracted features includes training a deep Boltzmann machine using the extracted features. In an example, generating the pseudo-semantic domain from the extracted features includes applying spectral embedding to the extracted features to reduce dimensionality.

In an example, generating the semantic model includes mapping the frames to the pseudo-semantic domain by, for each frame, deriving a coordinate in the pseudo-semantic domain, each element of the coordinate corresponding to a dimensionality of the pseudo-semantic domain and derived from a presence of a feature of the extracted features that is specific to the frame. In an example, mapping the frames to the pseudo-semantic domain where a deep Boltzmann machine was trained to create the pseudo-semantic domain includes feeding the frames forward through the deep Boltzmann machine. In an example, mapping the frames to the pseudo-semantic domain where a deep Boltzmann machine was trained to create the pseudo-semantic domain includes feeding the frames forward through the deep Boltzmann machine.

In an example, generating the semantic model includes creating a generative model from the frames mapped to the pseudo-semantic domain. In an example, creating the generative model includes creating a probabilistic graphical model. In an example, creating the generative model includes creating a mixture model. In an example, creating the generative model includes recursively identifying a set of key frames in the frames by adding a frame with a highest score to the set of frames, the score of a frame being the inverse of the sum of a square norm of the coordinate of the frame multiplied by a constant and divided by the square of the norm of the distance between the frame and a frame in the set of key frames for all members of the set of key frames.

At operation 1015, respective relevancy scores may be assigned to the frames. In an example, assigning respective relevancy scores to the frames includes extracting behavioral indicators of a person who took the video from the video. In an example, the behavioral indicators include a lack of motion of a camera used to capture the video. In an example, the behavioral indicators include an increased zoom of the camera used to capture the video. In an example, extracting behavioral indicators of a person who took the video from the video includes limiting the behavioral indicators that have a fifty percent or greater chance of indicating relevancy.

In an example, assigning respective relevancy scores to the frames includes applying a library of relevancy classifiers to the frames. In an example, the library of relevancy classifiers is amended by user feedback. In an example, output scores of applying the library of relevancy classifiers is combined with output from extracted behavioral indicators of a person who took the video from the video to create a composite relevancy score. In an example, the library of relevancy classifiers is filtered to exclude classifiers that have less than a fifty percent chance of indicating relevancy.

At operation 1020, the semantic model may be initialized with the respective relevancy scores. In an example, initializing the semantic model with the respective relevancy scores includes constructing a graph in which nodes correspond to the frames, nodes values correspond to respective relevancy scores of the frames, and edges are weighted by the inverse distance between frames established in the semantic model. In an example, edges are omitted or removed when the distance between two frames is beyond a threshold.

In an example, a first subset of key frames are identified as low-relevancy frames and a second subset of key frames are identified as high-relevancy frames based on the respective relevancy scores. In an example, nodes corresponding to the low-relevancy key frames and the high-relevancy key frames are marked as fixed values.

At operation 1025, the model may be iteratively processed to produce a set of sub-scenes. The set of sub-scenes being a summarization of the video. Operations 1030-1040 describe operations that are part of each iteration of the sub-scene production. In an example, iteratively processing the semantic model to produce a set of sub-scenes continues until a predetermined number of sub-scenes are identified. In an example, the predetermined number is a user input. In an example, the predetermined number is based on the length of the video. In an example, the predetermined number is based on the number of clusters of frames determined from the semantic model.

At operation 1030, the semantic model may be converged following initialization. In an example, converging the semantic model following initialization includes calculating node values for nodes in the semantic model that do not correspond to the low-relevancy key frames or the high-relevancy key frames. In an example, message passing between nodes along edges is used to calculate the node values. In an example, the message passing between nodes along edges to calculate the node values includes setting each node value to be a weighted average of neighboring nodes, a neighboring node being connected to the node by an edge, a weight of edges connecting the node and a neighboring node modifying a value of the neighboring node before being averaged to create the weighted average. In an example, the setting of each node value to be the weighted average of neighboring nodes continues until a convergence threshold is reached. In an example, the convergence threshold defines a rate of change in node values below which convergence is considered achieved.

At operation 1035, a sequence of frames with the highest relevancy score after convergence may be selected. In an example, selecting the sequence of frames with the highest relevancy score after converging includes selecting frames with corresponding nodes with a value greater than a selection threshold. In an example, the selection threshold is determined from the entirety of node values. In an example, the selection threshold is an average of the node values. In an example, selecting the sequence of frames includes creating a clip of the video with the sequence of frames.

At operation 1040, the semantic model may be re-initialized by fixing the relevancy scores for the selected sequence of frames. In an example, re-initializing the semantic model by fixing the relevancy scores for the selected sequence of frames includes marking the selected sequence of frames as fixed values in the semantic model. In an example, the fixed values are set to the lowest possible relevancy score. In an example, a new subset of high-relevancy key frames is selected and set as fixed value.

The method 1000 may also include the following optional operations: presenting a user interface including the sub-scenes in an order in which they were produced; receiving a discard selection from a user for a sub-scene; and discarding the sub-scene from a video summarization. In an example, relevancy criteria used in assigning the respective relevancy scores may be modified to deemphasize relevancy criteria found in the discarded sub-scene.

Figure 11:
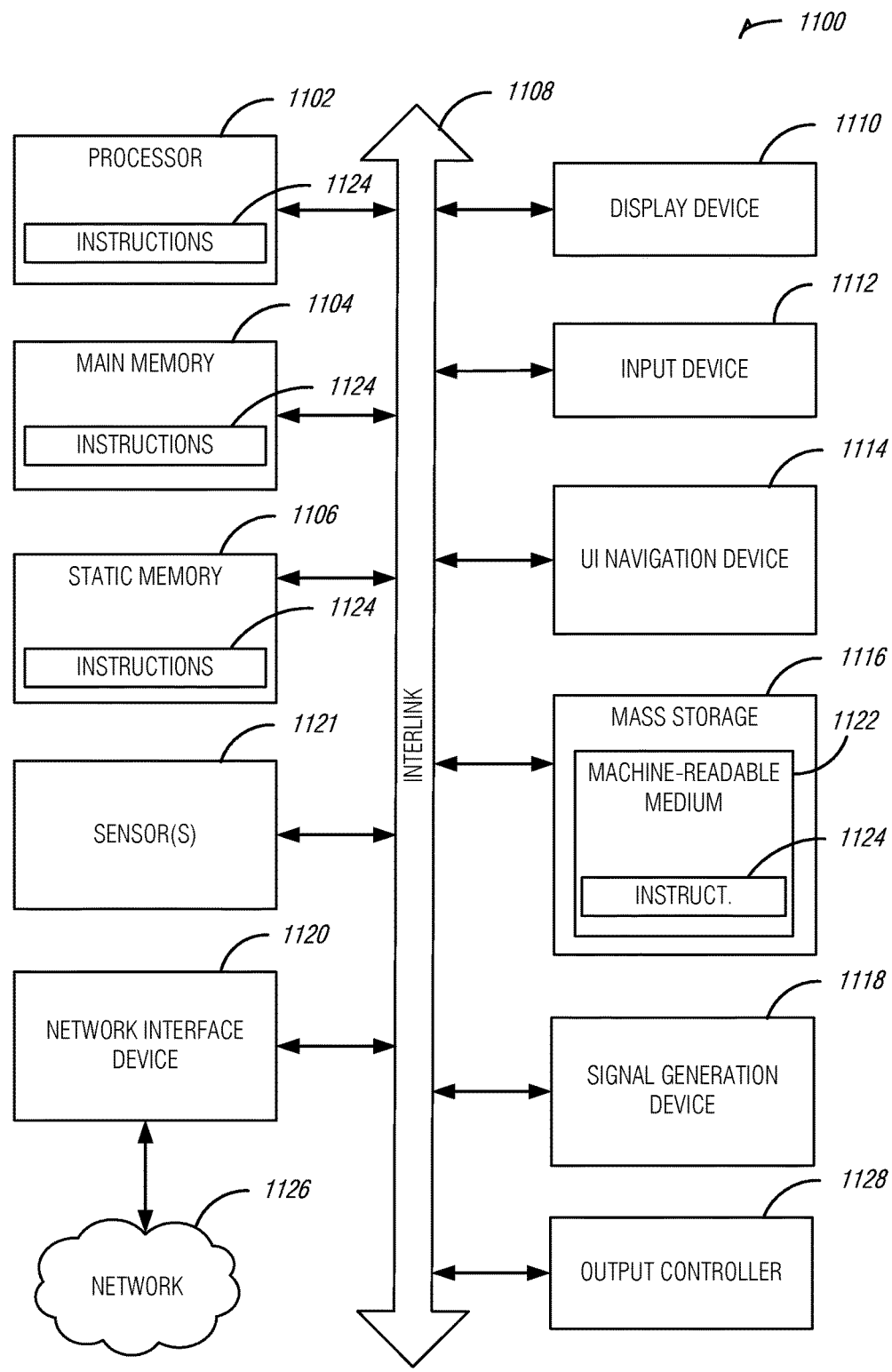
FIG. 11 is a block diagram illustrating an example of a machine upon which one or more embodiments may be implemented.

FIG. 11 illustrates a block diagram of an example machine 1100 upon which any one or more of the techniques (e.g., methodologies) discussed herein may perform. In alternative embodiments, the machine 1100 may operate as a stand-alone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1116 may constitute machine readable media.

While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software.

Additional Notes & Examples

Example 1 is a device for automatic video summarization, the method comprising: a storage device to hold a video; a semantic classifier to generate a semantic model of the video from frames of the video; a relevancy classifier to assign respective relevancy scores to the frames; a multiplexer to: initialize the semantic model with the respective relevancy scores; and process, iteratively, the semantic model to produce a set of sub-scenes, each iteration comprising the multiplexer to: converge the semantic model following initialization; select a sequence of frames with a highest relevancy score after converging; and re-initialize the semantic model by fixing the relevancy scores for the selected sequence of frames.

In Example 2, the subject matter of Example 1 optionally includes, wherein generating the semantic model includes extracting features of the frames.

In Example 3, the subject matter of Example 2 optionally includes, wherein extracting the features includes finding low level features.

In Example 4, the subject matter of Example 3 optionally includes, wherein the low level features include a GIST descriptor.

In Example 5, the subject matter of any one or more of Examples 3-4 optionally include, wherein the low level features include location.

In Example 6, the subject matter of any one or more of Examples 2-5 optionally include, wherein extracting the features includes finding high level features.

In Example 7, the subject matter of Example 6 optionally includes, wherein finding the high level features include applying a classifier to the frames to identify scene characteristics.

In Example 8, the subject matter of Example 7 optionally includes, wherein applying the classifier include using a deep convolution network trained for scene classification.

In Example 9, the subject matter of any one or more of Examples 7-8 optionally include, wherein the scene characteristics include one or more of a setting, an activity, or an object.

In Example 10, the subject matter of Example 9 optionally includes, wherein the setting is one of indoors, outdoors, at a beach, in a forest, or in an urban environment.

In Example 11, the subject matter of any one or more of Examples 9-10 optionally include, wherein the activity is one of a party, a sport, an event, or work.

In Example 12, the subject matter of any one or more of Examples 9-11 optionally include, wherein the object is at least one of a face, an animal, a landmark, or sporting equipment.

In Example 13, the subject matter of any one or more of Examples 2-12 optionally include, wherein generating the semantic model includes generating a pseudo-semantic domain from the extracted features, wherein the pseudo-semantic domain is an n-dimensional space derived from the features.

In Example 14, the subject matter of Example 13 optionally includes, wherein generating the pseudo-semantic domain from the extracted features includes training a deep Boltzmann machine using the extracted features.

In Example 15, the subject matter of any one or more of Examples 13-14 optionally include, wherein generating the pseudo-semantic domain from the extracted features includes applying spectral clustering to the extracted features to reduce dimensionality.

In Example 16, the subject matter of any one or more of Examples 13-15 optionally include, wherein generating the semantic model includes mapping the frames to the pseudo-semantic domain by, for each frame, deriving a coordinate in the pseudo-semantic domain, each element of the coordinate corresponding to a dimensionality of the pseudo-semantic domain and derived from a presence of a feature of the extracted features that is specific to the frame.

In Example 17, the subject matter of Example 16 optionally includes, wherein mapping the frames to the pseudo-semantic domain where a deep Boltzmann machine was trained to create the pseudo-semantic domain includes feeding the frames forward through the deep Boltzmann machine.

In Example 18, the subject matter of any one or more of Examples 16-17 optionally include, wherein mapping the frames to the pseudo-semantic domain where a deep Boltzmann machine was trained to create the pseudo-semantic domain includes feeding the frames forward through the deep Boltzmann machine.

In Example 19, the subject matter of any one or more of Examples 16-18 optionally include, wherein generating the semantic model includes creating a generative model from the frames mapped to the pseudo-semantic domain.

In Example 20, the subject matter of Example 19 optionally includes, wherein creating the generative model includes creating a probabilistic graphical model.

In Example 21, the subject matter of any one or more of Examples 19-20 optionally include, wherein creating the generative model includes creating a mixture model.

In Example 22, the subject matter of any one or more of Examples 19-21 optionally include, wherein creating the generative model includes recursively identifying a set of key frames in the frames by adding a frame with a highest score to the set of frames, the score of a frame being the inverse of the sum of a square norm of the coordinate of the frame multiplied by a constant and divided by the square of the norm of the distance between the frame and a frame in the set of key frames for all members of the set of key frames.

In Example 23, the subject matter of any one or more of Examples 1-22 optionally include, wherein assigning respective relevancy scores to the frames includes extracting behavioral indicators of a person who took the video from the video.

In Example 24, the subject matter of Example 23 optionally includes, wherein the behavioral indicators include a lack of motion of a camera used to capture the video.

In Example 25, the subject matter of any one or more of Examples 23-24 optionally include, wherein the behavioral indicators include an increased zoom of the camera used to capture the video.

In Example 26, the subject matter of any one or more of Examples 23-25 optionally include, wherein extracting behavioral indicators of a person who took the video from the video includes limiting the behavioral indicators that have a fifty percent or greater chance of indicating relevancy.

In Example 27, the subject matter of any one or more of Examples 1-26 optionally include, wherein assigning respective relevancy scores to the frames includes applying a library of relevancy classifiers to the frames.

In Example 28, the subject matter of Example 27 optionally includes, wherein the library of relevancy classifiers is amended by user feedback.

In Example 29, the subject matter of any one or more of Examples 27-28 optionally include, wherein output scores of applying the library of relevancy classifiers is combined with output from extracted behavioral indicators of a person who took the video from the video to create a composite relevancy score.

In Example 30, the subject matter of any one or more of Examples 27-29 optionally include, wherein the library of relevancy classifiers is filtered to exclude classifiers that have less than a fifty percent chance of indicating relevancy.

In Example 31, the subject matter of any one or more of Examples 1-30 optionally include, wherein initializing the semantic model with the respective relevancy scores includes constructing a graph in which nodes correspond to the frames, nodes values correspond to respective relevancy scores of the frames, and edges are weighted by the inverse distance between frames established in the semantic model.

In Example 32, the subject matter of Example 31 optionally includes, wherein edges are omitted or removed when the distance between two frames is beyond a threshold.

In Example 33, the subject matter of any one or more of Examples 31-32 optionally include, wherein a first subset of key frames are identified as low-relevancy frames and a second subset of key frames are identified as high-relevancy frames based on the respective relevancy scores.

In Example 34, the subject matter of Example 33 optionally includes, wherein nodes corresponding to the low-relevancy key frames and the high-relevancy key frames are marked as fixed values.

In Example 35, the subject matter of Example 34 optionally includes, wherein converging the semantic model following initialization includes calculating node values for nodes in the semantic model that do not correspond to the low-relevancy key frames or the high-relevancy key frames.

In Example 36, the subject matter of Example 35 optionally includes, wherein message passing between nodes along edges is used to calculate the node values.

In Example 37, the subject matter of Example 36 optionally includes, wherein the message passing between nodes along edges to calculate the node values includes setting each node value to be a weighted average of neighboring nodes, a neighboring node being connected to the node by an edge, a weight of edges connecting the node and a neighboring node modifying a value of the neighboring node before being averaged to create the weighted average.

In Example 38, the subject matter of Example 37 optionally includes, wherein the setting of each node value to be the weighted average of neighboring nodes continues until a convergence threshold is reached.

In Example 39, the subject matter of Example 38 optionally includes, wherein the convergence threshold defines a rate of change in node values below which convergence is considered achieved.

In Example 40, the subject matter of any one or more of Examples 38-39 optionally include, wherein selecting the sequence of frames with the highest relevancy score after converging includes selecting frames with corresponding nodes with a value greater than a selection threshold.

In Example 41, the subject matter of Example 40 optionally includes, wherein the selection threshold is determined from the entirety of node values.

In Example 42, the subject matter of Example 41 optionally includes, wherein the selection threshold is an average of the node values.

In Example 43, the subject matter of any one or more of Examples 40-42 optionally include, wherein selecting the sequence of frames includes creating a clip of the video with the sequence of frames.

In Example 44, the subject matter of Example 43 optionally includes, wherein re-initializing the semantic model by fixing the relevancy scores for the selected sequence of frames includes marking the selected sequence of frames as fixed values in the semantic model.

In Example 45, the subject matter of Example 44 optionally includes, wherein the fixed values are set to the lowest possible relevancy score.

In Example 46, the subject matter of any one or more of Examples 44-45 optionally include, wherein a new subset of high-relevancy key frames is selected and set as fixed value.

In Example 47, the subject matter of any one or more of Examples 1-46 optionally include, wherein iteratively processing the semantic model to produce a set of sub-scenes continues until a predetermined number of sub-scenes are identified.

In Example 48, the subject matter of Example 47 optionally includes, wherein the predetermined number is a user input.

In Example 49, the subject matter of any one or more of Examples 47-48 optionally include, wherein the predetermined number is based on the length of the video.

In Example 50, the subject matter of any one or more of Examples 47-49 optionally include, wherein the predetermined number is based on the number of clusters of frames determined from the semantic model.

In Example 51, the subject matter of any one or more of Examples 1-50 optionally include controller to: present a user interface including the sub-scenes in an order in which they were produced; receive a discard selection from a user for a sub-scene; and discard the sub-scene from a video summarization.

In Example 52, the subject matter of any one or more of Examples 1-51 optionally include, wherein the relevancy classifier is to modify relevancy criteria used in assigning the respective relevancy scores to deemphasize relevancy criteria found in the discarded sub-scene.

Example 53 is a machine-implemented method for automatic video summarization, the method comprising: obtaining a video; generating a semantic model of the video from frames of the video; assigning respective relevancy scores to the frames; initializing the semantic model with the respective relevancy scores; and iteratively processing the semantic model to produce a set of sub-scenes, each iteration comprising: converging the semantic model following initialization; selecting a sequence of frames with a highest relevancy score after converging; and re-initializing the semantic model by fixing the relevancy scores for the selected sequence of frames.

In Example 54, the subject matter of Example 53 optionally includes, wherein generating the semantic model includes extracting features of the frames.

In Example 55, the subject matter of Example 54 optionally includes, wherein extracting the features includes finding low level features.

In Example 56, the subject matter of Example 55 optionally includes, wherein the low level features include a GIST descriptor.

In Example 57, the subject matter of any one or more of Examples 55-56 optionally include, wherein the low level features include location.

In Example 58, the subject matter of any one or more of Examples 54-57 optionally include, wherein extracting the features includes finding high level features.

In Example 59, the subject matter of Example 58 optionally includes, wherein finding the high level features include applying a classifier to the frames to identify scene characteristics.

In Example 60, the subject matter of Example 59 optionally includes, wherein applying the classifier include using a deep convolution network trained for scene classification.

In Example 61, the subject matter of any one or more of Examples 59-60 optionally include, wherein the scene characteristics include one or more of a setting, an activity, or an object.

In Example 62, the subject matter of Example 61 optionally includes, wherein the setting is one of indoors, outdoors, at a beach, in a forest, or in an urban environment.

In Example 63, the subject matter of any one or more of Examples 61-62 optionally include, wherein the activity is one of a party, a sport, an event, or work.

In Example 64, the subject matter of any one or more of Examples 61-63 optionally include, wherein the object is at least one of a face, an animal, a landmark, or sporting equipment.

In Example 65, the subject matter of any one or more of Examples 54-64 optionally include, wherein generating the semantic model includes generating a pseudo-semantic domain from the extracted features, wherein the pseudo-semantic domain is an n-dimensional space derived from the features.

In Example 66, the subject matter of Example 65 optionally includes, wherein generating the pseudo-semantic domain from the extracted features includes training a deep Boltzmann machine using the extracted features.

In Example 67, the subject matter of any one or more of Examples 65-66 optionally include, wherein generating the pseudo-semantic domain from the extracted features includes applying spectral clustering to the extracted features to reduce dimensionality.

In Example 68, the subject matter of any one or more of Examples 65-67 optionally include, wherein generating the semantic model includes mapping the frames to the pseudo-semantic domain by, for each frame, deriving a coordinate in the pseudo-semantic domain, each element of the coordinate corresponding to a dimensionality of the pseudo-semantic domain and derived from a presence of a feature of the extracted features that is specific to the frame.

In Example 69, the subject matter of Example 68 optionally includes, wherein mapping the frames to the pseudo-semantic domain where a deep Boltzmann machine was trained to create the pseudo-semantic domain includes feeding the frames forward through the deep Boltzmann machine.

In Example 70, the subject matter of any one or more of Examples 68-69 optionally include, wherein mapping the frames to the pseudo-semantic domain where a deep Boltzmann machine was trained to create the pseudo-semantic domain includes feeding the frames forward through the deep Boltzmann machine.

In Example 71, the subject matter of any one or more of Examples 68-70 optionally include, wherein generating the semantic model includes creating a generative model from the frames mapped to the pseudo-semantic domain.

In Example 72, the subject matter of Example 71 optionally includes, wherein creating the generative model includes creating a probabilistic graphical model.

In Example 73, the subject matter of any one or more of Examples 71-72 optionally include, wherein creating the generative model includes creating a mixture model.

In Example 74, the subject matter of any one or more of Examples 71-73 optionally include, wherein creating the generative model includes recursively identifying a set of key frames in the frames by adding a frame with a highest score to the set of frames, the score of a frame being the inverse of the sum of a square norm of the coordinate of the frame multiplied by a constant and divided by the square of the norm of the distance between the frame and a frame in the set of key frames for all members of the set of key frames.

In Example 75, the subject matter of any one or more of Examples 53-74 optionally include, wherein assigning respective relevancy scores to the frames includes extracting behavioral indicators of a person who took the video from the video.

In Example 76, the subject matter of Example 75 optionally includes, wherein the behavioral indicators include a lack of motion of a camera used to capture the video.

In Example 77, the subject matter of any one or more of Examples 75-76 optionally include, wherein the behavioral indicators include an increased zoom of the camera used to capture the video.

In Example 78, the subject matter of any one or more of Examples 75-77 optionally include, wherein extracting behavioral indicators of a person who took the video from the video includes limiting the behavioral indicators that have a fifty percent or greater chance of indicating relevancy.

In Example 79, the subject matter of any one or more of Examples 53-78 optionally include, wherein assigning respective relevancy scores to the frames includes applying a library of relevancy classifiers to the frames.

In Example 80, the subject matter of Example 79 optionally includes, wherein the library of relevancy classifiers is amended by user feedback.

In Example 81, the subject matter of any one or more of Examples 79-80 optionally include, wherein output scores of applying the library of relevancy classifiers is combined with output from extracted behavioral indicators of a person who took the video from the video to create a composite relevancy score.

In Example 82, the subject matter of any one or more of Examples 79-81 optionally include, wherein the library of relevancy classifiers is filtered to exclude classifiers that have less than a fifty percent chance of indicating relevancy.

In Example 83, the subject matter of any one or more of Examples 53-82 optionally include, wherein initializing the semantic model with the respective relevancy scores includes constructing a graph in which nodes correspond to the frames, nodes values correspond to respective relevancy scores of the frames, and edges are weighted by the inverse distance between frames established in the semantic model.

In Example 84, the subject matter of Example 83 optionally includes, wherein edges are omitted or removed when the distance between two frames is beyond a threshold.

In Example 85, the subject matter of any one or more of Examples 83-84 optionally include, wherein a first subset of key frames are identified as low-relevancy frames and a second subset of key frames are identified as high-relevancy frames based on the respective relevancy scores.

In Example 86, the subject matter of Example 85 optionally includes, wherein nodes corresponding to the low-relevancy key frames and the high-relevancy key frames are marked as fixed values.

In Example 87, the subject matter of Example 86 optionally includes, wherein converging the semantic model following initialization includes calculating node values for nodes in the semantic model that do not correspond to the low-relevancy key frames or the high-relevancy key frames.

In Example 88, the subject matter of Example 87 optionally includes, wherein message passing between nodes along edges is used to calculate the node values.

In Example 89, the subject matter of Example 88 optionally includes, wherein the message passing between nodes along edges to calculate the node values includes setting each node value to be a weighted average of neighboring nodes, a neighboring node being connected to the node by an edge, a weight of edges connecting the node and a neighboring node modifying a value of the neighboring node before being averaged to create the weighted average.

In Example 90, the subject matter of Example 89 optionally includes, wherein the setting of each node value to be the weighted average of neighboring nodes continues until a convergence threshold is reached.

In Example 91, the subject matter of Example 90 optionally includes, wherein the convergence threshold defines a rate of change in node values below which convergence is considered achieved.

In Example 92, the subject matter of any one or more of Examples 90-91 optionally include, wherein selecting the sequence of frames with the highest relevancy score after converging includes selecting frames with corresponding nodes with a value greater than a selection threshold.

In Example 93, the subject matter of Example 92 optionally includes, wherein the selection threshold is determined from the entirety of node values.

In Example 94, the subject matter of Example 93 optionally includes, wherein the selection threshold is an average of the node values.

In Example 95, the subject matter of any one or more of Examples 92-94 optionally include, wherein selecting the sequence of frames includes creating a clip of the video with the sequence of frames.

In Example 96, the subject matter of Example 95 optionally includes, wherein re-initializing the semantic model by fixing the relevancy scores for the selected sequence of frames includes marking the selected sequence of frames as fixed values in the semantic model.

In Example 97, the subject matter of Example 96 optionally includes, wherein the fixed values are set to the lowest possible relevancy score.

In Example 98, the subject matter of any one or more of Examples 96-97 optionally include, wherein a new subset of high-relevancy key frames is selected and set as fixed value.

In Example 99, the subject matter of any one or more of Examples 53-98 optionally include, wherein iteratively processing the semantic model to produce a set of sub-scenes continues until a predetermined number of sub-scenes are identified.

In Example 100, the subject matter of Example 99 optionally includes, wherein the predetermined number is a user input.

In Example 101, the subject matter of any one or more of Examples 99-100 optionally include, wherein the predetermined number is based on the length of the video.

In Example 102, the subject matter of any one or more of Examples 99-101 optionally include, wherein the predetermined number is based on the number of clusters of frames determined from the semantic model.

In Example 103, the subject matter of any one or more of Examples 53-102 optionally include: presenting a user interface including the sub-scenes in an order in which they were produced; receiving a discard selection from a user for a sub-scene; and discarding the sub-scene from a video summarization.

In Example 104, the subject matter of any one or more of Examples 53-103 optionally include, modifying relevancy criteria used in assigning the respective relevancy scores to deemphasize relevancy criteria found in the discarded sub-scene.

Example 105 is a system comprising means to perform any of the methods of Examples 53-104.

Example 106 is at least one machine readable medium including instructions that, when executed by a machine, cause the machine to perform any of the methods of Examples 53-104.

Example 107 is at least one machine readable medium including instructions that, when executed by a machine, cause the machine to perform operations for automatic video summarization, the operations comprising: obtaining a video; generating a semantic model of the video from frames of the video; assigning respective relevancy scores to the frames; initializing the semantic model with the respective relevancy scores; and iteratively processing the semantic model to produce a set of sub-scenes, each iteration comprising: converging the semantic model following initialization; selecting a sequence of frames with a highest relevancy score after converging; and re-initializing the semantic model by fixing the relevancy scores for the selected sequence of frames.

In Example 108, the subject matter of Example 107 optionally includes, wherein generating the semantic model includes extracting features of the frames.

In Example 109, the subject matter of Example 108 optionally includes, wherein extracting the features includes finding low level features.

In Example 110, the subject matter of Example 109 optionally includes, wherein the low level features include a GIST descriptor.

In Example 111, the subject matter of any one or more of Examples 109-110 optionally include, wherein the low level features include location.

In Example 112, the subject matter of any one or more of Examples 108-111 optionally include, wherein extracting the features includes finding high level features.

In Example 113, the subject matter of Example 112 optionally includes, wherein finding the high level features include applying a classifier to the frames to identify scene characteristics.

In Example 114, the subject matter of Example 113 optionally includes, wherein applying the classifier include using a deep convolution network trained for scene classification.

In Example 115, the subject matter of any one or more of Examples 113-114 optionally include, wherein the scene characteristics include one or more of a setting, an activity, or an object.

In Example 116, the subject matter of Example 115 optionally includes, wherein the setting is one of indoors, outdoors, at a beach, in a forest, or in an urban environment.

In Example 117, the subject matter of any one or more of Examples 115-116 optionally include, wherein the activity is one of a party, a sport, an event, or work.

In Example 118, the subject matter of any one or more of Examples 115-117 optionally include, wherein the object is at least one of a face, an animal, a landmark, or sporting equipment.

In Example 119, the subject matter of any one or more of Examples 108-118 optionally include, wherein generating the semantic model includes generating a pseudo-semantic domain from the extracted features, wherein the pseudo-semantic domain is an n-dimensional space derived from the features.

In Example 120, the subject matter of Example 119 optionally includes, wherein generating the pseudo-semantic domain from the extracted features includes training a deep Boltzmann machine using the extracted features.

In Example 121, the subject matter of any one or more of Examples 119-120 optionally include, wherein generating the pseudo-semantic domain from the extracted features includes applying spectral clustering to the extracted features to reduce dimensionality.

In Example 122, the subject matter of any one or more of Examples 119-121 optionally include, wherein generating the semantic model includes mapping the frames to the pseudo-semantic domain by, for each frame, deriving a coordinate in the pseudo-semantic domain, each element of the coordinate corresponding to a dimensionality of the pseudo-semantic domain and derived from a presence of a feature of the extracted features that is specific to the frame.

In Example 123, the subject matter of Example 122 optionally includes, wherein mapping the frames to the pseudo-semantic domain where a deep Boltzmann machine was trained to create the pseudo-semantic domain includes feeding the frames forward through the deep Boltzmann machine.

In Example 124, the subject matter of any one or more of Examples 122-123 optionally include, wherein mapping the frames to the pseudo-semantic domain where a deep Boltzmann machine was trained to create the pseudo-semantic domain includes feeding the frames forward through the deep Boltzmann machine.

In Example 125, the subject matter of any one or more of Examples 122-124 optionally include, wherein generating the semantic model includes creating a generative model from the frames mapped to the pseudo-semantic domain.

In Example 126, the subject matter of Example 125 optionally includes, wherein creating the generative model includes creating a probabilistic graphical model.

In Example 127, the subject matter of any one or more of Examples 125-126 optionally include, wherein creating the generative model includes creating a mixture model.

In Example 128, the subject matter of any one or more of Examples 125-127 optionally include, wherein creating the generative model includes recursively identifying a set of key frames in the frames by adding a frame with a highest score to the set of frames, the score of a frame being the inverse of the sum of a square norm of the coordinate of the frame multiplied by a constant and divided by the square of the norm of the distance between the frame and a frame in the set of key frames for all members of the set of key frames.

In Example 129, the subject matter of any one or more of Examples 107-128 optionally include, wherein assigning respective relevancy scores to the frames includes extracting behavioral indicators of a person who took the video from the video.

In Example 130, the subject matter of Example 129 optionally includes, wherein the behavioral indicators include a lack of motion of a camera used to capture the video.

In Example 131, the subject matter of any one or more of Examples 129-130 optionally include, wherein the behavioral indicators include an increased zoom of the camera used to capture the video.

In Example 132, the subject matter of any one or more of Examples 129-131 optionally include, wherein extracting behavioral indicators of a person who took the video from the video includes limiting the behavioral indicators that have a fifty percent or greater chance of indicating relevancy.

In Example 133, the subject matter of any one or more of Examples 107-132 optionally include, wherein assigning respective relevancy scores to the frames includes applying a library of relevancy classifiers to the frames.

In Example 134, the subject matter of Example 133 optionally includes, wherein the library of relevancy classifiers is amended by user feedback.

In Example 135, the subject matter of any one or more of Examples 133-134 optionally include, wherein output scores of applying the library of relevancy classifiers is combined with output from extracted behavioral indicators of a person who took the video from the video to create a composite relevancy score.

In Example 136, the subject matter of any one or more of Examples 133-135 optionally include, wherein the library of relevancy classifiers is filtered to exclude classifiers that have less than a fifty percent chance of indicating relevancy.

In Example 137, the subject matter of any one or more of Examples 107-136 optionally include, wherein initializing the semantic model with the respective relevancy scores includes constructing a graph in which nodes correspond to the frames, nodes values correspond to respective relevancy scores of the frames, and edges are weighted by the inverse distance between frames established in the semantic model.

In Example 138, the subject matter of Example 137 optionally includes, wherein edges are omitted or removed when the distance between two frames is beyond a threshold.

In Example 139, the subject matter of any one or more of Examples 137-138 optionally include, wherein a first subset of key frames are identified as low-relevancy frames and a second subset of key frames are identified as high-relevancy frames based on the respective relevancy scores.

In Example 140, the subject matter of Example 139 optionally includes, wherein nodes corresponding to the low-relevancy key frames and the high-relevancy key frames are marked as fixed values.

In Example 141, the subject matter of Example 140 optionally includes, wherein converging the semantic model following initialization includes calculating node values for nodes in the semantic model that do not correspond to the low-relevancy key frames or the high-relevancy key frames.

In Example 142, the subject matter of Example 141 optionally includes, wherein message passing between nodes along edges is used to calculate the node values.

In Example 143, the subject matter of Example 142 optionally includes, wherein the message passing between nodes along edges to calculate the node values includes setting each node value to be a weighted average of neighboring nodes, a neighboring node being connected to the node by an edge, a weight of edges connecting the node and a neighboring node modifying a value of the neighboring node before being averaged to create the weighted average.

In Example 144, the subject matter of Example 143 optionally includes, wherein the setting of each node value to be the weighted average of neighboring nodes continues until a convergence threshold is reached.

In Example 145, the subject matter of Example 144 optionally includes, wherein the convergence threshold defines a rate of change in node values below which convergence is considered achieved.

In Example 146, the subject matter of any one or more of Examples 144-145 optionally include, wherein selecting the sequence of frames with the highest relevancy score after converging includes selecting frames with corresponding nodes with a value greater than a selection threshold.

In Example 147, the subject matter of Example 146 optionally includes, wherein the selection threshold is determined from the entirety of node values.

In Example 148, the subject matter of Example 147 optionally includes, wherein the selection threshold is an average of the node values.

In Example 149, the subject matter of any one or more of Examples 146-148 optionally include, wherein selecting the sequence of frames includes creating a clip of the video with the sequence of frames.

In Example 150, the subject matter of Example 149 optionally includes, wherein re-initializing the semantic model by fixing the relevancy scores for the selected sequence of frames includes marking the selected sequence of frames as fixed values in the semantic model.

In Example 151, the subject matter of Example 150 optionally includes, wherein the fixed values are set to the lowest possible relevancy score.

In Example 152, the subject matter of any one or more of Examples 150-151 optionally include, wherein a new subset of high-relevancy key frames is selected and set as fixed value.

In Example 153, the subject matter of any one or more of Examples 107-152 optionally include, wherein iteratively processing the semantic model to produce a set of sub-scenes continues until a predetermined number of sub-scenes are identified.

In Example 154, the subject matter of Example 153 optionally includes, wherein the predetermined number is a user input.

In Example 155, the subject matter of any one or more of Examples 153-154 optionally include, wherein the predetermined number is based on the length of the video.

In Example 156, the subject matter of any one or more of Examples 153-155 optionally include, wherein the predetermined number is based on the number of clusters of frames determined from the semantic model.

In Example 157, the subject matter of any one or more of Examples 107-156 optionally include, where the instructions comprise: presenting a user interface including the sub-scenes in an order in which they were produced; receiving a discard selection from a user for a sub-scene; and discarding the sub-scene from a video summarization.

In Example 158, the subject matter of any one or more of Examples 107-157 optionally include, wherein the instructions comprise modifying relevancy criteria used in assigning the respective relevancy scores to deemphasize relevancy criteria found in the discarded sub-scene.

Example 159 is a system for automatic video summarization, the system comprising: means for obtaining a video; means for generating a semantic model of the video from frames of the video; means for assigning respective relevancy scores to the frames; means for initializing the semantic model with the respective relevancy scores; and means for iteratively processing the semantic model to produce a set of sub-scenes, each iteration comprising: means for converging the semantic model following initialization; means for selecting a sequence of frames with a highest relevancy score after converging; and means for re-initializing the semantic model by fixing the relevancy scores for the selected sequence of frames.

In Example 160, the subject matter of Example 159 optionally includes, wherein generating the semantic model includes extracting features of the frames.

In Example 161, the subject matter of Example 160 optionally includes, wherein extracting the features includes finding low level features.

In Example 162, the subject matter of Example 161 optionally includes, wherein the low level features include a GIST descriptor.

In Example 163, the subject matter of any one or more of Examples 161-162 optionally include, wherein the low level features include location.

In Example 164, the subject matter of any one or more of Examples 160-163 optionally include, wherein extracting the features includes finding high level features.

In Example 165, the subject matter of Example 164 optionally includes, wherein finding the high level features include applying a classifier to the frames to identify scene characteristics.

In Example 166, the subject matter of Example 165 optionally includes, wherein applying the classifier include using a deep convolution network trained for scene classification.

In Example 167, the subject matter of any one or more of Examples 165-166 optionally include, wherein the scene characteristics include one or more of a setting, an activity, or an object.

In Example 168, the subject matter of Example 167 optionally includes, wherein the setting is one of indoors, outdoors, at a beach, in a forest, or in an urban environment.

In Example 169, the subject matter of any one or more of Examples 167-168 optionally include, wherein the activity is one of a party, a sport, an event, or work.

In Example 170, the subject matter of any one or more of Examples 167-169 optionally include, wherein the object is at least one of a face, an animal, a landmark, or sporting equipment.

In Example 171, the subject matter of any one or more of Examples 160-170 optionally include, wherein generating the semantic model includes generating a pseudo-semantic domain from the extracted features, wherein the pseudo-semantic domain is an n-dimensional space derived from the features.

In Example 172, the subject matter of Example 171 optionally includes, wherein generating the pseudo-semantic domain from the extracted features includes training a deep Boltzmann machine using the extracted features.

In Example 173, the subject matter of any one or more of Examples 171-172 optionally include, wherein generating the pseudo-semantic domain from the extracted features includes applying spectral clustering to the extracted features to reduce dimensionality.

In Example 174, the subject matter of any one or more of Examples 171-173 optionally include, wherein generating the semantic model includes mapping the frames to the pseudo-semantic domain by, for each frame, deriving a coordinate in the pseudo-semantic domain, each element of the coordinate corresponding to a dimensionality of the pseudo-semantic domain and derived from a presence of a feature of the extracted features that is specific to the frame.

In Example 175, the subject matter of Example 174 optionally includes, wherein mapping the frames to the pseudo-semantic domain where a deep Boltzmann machine was trained to create the pseudo-semantic domain includes feeding the frames forward through the deep Boltzmann machine.

In Example 176, the subject matter of any one or more of Examples 174-175 optionally include, wherein mapping the frames to the pseudo-semantic domain where a deep Boltzmann machine was trained to create the pseudo-semantic domain includes feeding the frames forward through the deep Boltzmann machine.

In Example 177, the subject matter of any one or more of Examples 174-176 optionally include, wherein generating the semantic model includes creating a generative model from the frames mapped to the pseudo-semantic domain.

In Example 178, the subject matter of Example 177 optionally includes, wherein creating the generative model includes creating a probabilistic graphical model.

In Example 179, the subject matter of any one or more of Examples 177-178 optionally include, wherein creating the generative model includes creating a mixture model.

In Example 180, the subject matter of any one or more of Examples 177-179 optionally include, wherein creating the generative model includes recursively identifying a set of key frames in the frames by adding a frame with a highest score to the set of frames, the score of a frame being the inverse of the sum of a square norm of the coordinate of the frame multiplied by a constant and divided by the square of the norm of the distance between the frame and a frame in the set of key frames for all members of the set of key frames.

In Example 181, the subject matter of any one or more of Examples 159-180 optionally include, wherein assigning respective relevancy scores to the frames includes extracting behavioral indicators of a person who took the video from the video.

In Example 182, the subject matter of Example 181 optionally includes, wherein the behavioral indicators include a lack of motion of a camera used to capture the video.

In Example 183, the subject matter of any one or more of Examples 181-182 optionally include, wherein the behavioral indicators include an increased zoom of the camera used to capture the video.

In Example 184, the subject matter of any one or more of Examples 181-183 optionally include, wherein extracting behavioral indicators of a person who took the video from the video includes limiting the behavioral indicators that have a fifty percent or greater chance of indicating relevancy.

In Example 185, the subject matter of any one or more of Examples 159-184 optionally include, wherein assigning respective relevancy scores to the frames includes applying a library of relevancy classifiers to the frames.

In Example 186, the subject matter of Example 185 optionally includes, wherein the library of relevancy classifiers is amended by user feedback.

In Example 187, the subject matter of any one or more of Examples 185-186 optionally include, wherein output scores of applying the library of relevancy classifiers is combined with output from extracted behavioral indicators of a person who took the video from the video to create a composite relevancy score.

In Example 188, the subject matter of any one or more of Examples 185-187 optionally include, wherein the library of relevancy classifiers is filtered to exclude classifiers that have less than a fifty percent chance of indicating relevancy.

In Example 189, the subject matter of any one or more of Examples 159-188 optionally include, wherein initializing the semantic model with the respective relevancy scores includes constructing a graph in which nodes correspond to the frames, nodes values correspond to respective relevancy scores of the frames, and edges are weighted by the inverse distance between frames established in the semantic model.

In Example 190, the subject matter of Example 189 optionally includes, wherein edges are omitted or removed when the distance between two frames is beyond a threshold.

In Example 191, the subject matter of any one or more of Examples 189-190 optionally include, wherein a first subset of key frames are identified as low-relevancy frames and a second subset of key frames are identified as high-relevancy frames based on the respective relevancy scores.

In Example 192, the subject matter of Example 191 optionally includes, wherein nodes corresponding to the low-relevancy key frames and the high-relevancy key frames are marked as fixed values.

In Example 193, the subject matter of Example 192 optionally includes, wherein converging the semantic model following initialization includes calculating node values for nodes in the semantic model that do not correspond to the low-relevancy key frames or the high-relevancy key frames.

In Example 194, the subject matter of Example 193 optionally includes, wherein message passing between nodes along edges is used to calculate the node values.

In Example 195, the subject matter of Example 194 optionally includes, wherein the message passing between nodes along edges to calculate the node values includes setting each node value to be a weighted average of neighboring nodes, a neighboring node being connected to the node by an edge, a weight of edges connecting the node and a neighboring node modifying a value of the neighboring node before being averaged to create the weighted average.

In Example 196, the subject matter of Example 195 optionally includes, wherein the setting of each node value to be the weighted average of neighboring nodes continues until a convergence threshold is reached.

In Example 197, the subject matter of Example 196 optionally includes, wherein the convergence threshold defines a rate of change in node values below which convergence is considered achieved.

In Example 198, the subject matter of any one or more of Examples 196-197 optionally include, wherein selecting the sequence of frames with the highest relevancy score after converging includes selecting frames with corresponding nodes with a value greater than a selection threshold.

In Example 199, the subject matter of Example 198 optionally includes, wherein the selection threshold is determined from the entirety of node values.

In Example 200, the subject matter of Example 199 optionally includes, wherein the selection threshold is an average of the node values.

In Example 201, the subject matter of any one or more of Examples 198-200 optionally include, wherein selecting the sequence of frames includes creating a clip of the video with the sequence of frames.

In Example 202, the subject matter of Example 201 optionally includes, wherein re-initializing the semantic model by fixing the relevancy scores for the selected sequence of frames includes marking the selected sequence of frames as fixed values in the semantic model.

In Example 203, the subject matter of Example 202 optionally includes, wherein the fixed values are set to the lowest possible relevancy score.

In Example 204, the subject matter of any one or more of Examples 202-203 optionally include, wherein a new subset of high-relevancy key frames is selected and set as fixed value.

In Example 205, the subject matter of any one or more of Examples 159-204 optionally include, wherein iteratively processing the semantic model to produce a set of sub-scenes continues until a predetermined number of sub-scenes are identified.

In Example 206, the subject matter of Example 205 optionally includes, wherein the predetermined number is a user input.

In Example 207, the subject matter of any one or more of Examples 205-206 optionally include, wherein the predetermined number is based on the length of the video.

In Example 208, the subject matter of any one or more of Examples 205-207 optionally include, wherein the predetermined number is based on the number of clusters of frames determined from the semantic model.

In Example 209, the subject matter of any one or more of Examples 159-208 optionally include: means for presenting a user interface including the sub-scenes in an order in which they were produced; means for receiving a discard selection from a user for a sub-scene; and means for discarding the sub-scene from a video summarization.

In Example 210, the subject matter of any one or more of Examples 159-209 optionally include means for modifying relevancy criteria used in assigning the respective relevancy scores to deemphasize relevancy criteria found in the discarded sub-scene.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device for automatic video summarization, the method comprising:
   a storage device to hold a video;
   a semantic classifier to generate a semantic model of the video from frames of the video;
   a relevancy classifier to assign respective relevancy scores to the frames;
   a multiplexer to:
      initialize the semantic model with the respective relevancy scores including constructing a graph in which nodes correspond to the frames, node values correspond to respective relevancy scores of the frames, and edges are weighted by the inverse distance between frames established in the semantic model; and
      process, iteratively, the semantic model to produce a set of sub-scenes, each iteration comprising the multiplexer to:
      converge the semantic model following initialization;
      select a sequence of frames with a highest relevancy score after converging; and
      re-initialize the semantic model by fixing the relevancy scores for the selected sequence of frames.

2. The device of claim 1, wherein generating the semantic model includes extracting features of the frames.

3. The device of claim 2, wherein generating the semantic model includes generating a pseudo-semantic domain from the extracted features, wherein the pseudo-semantic domain is an n-dimensional space derived from the features.

4. The device of claim 3, wherein generating the semantic model includes mapping the frames to the pseudo-semantic domain by, for each frame, deriving a coordinate in the pseudo-semantic domain, each element of the coordinate corresponding to a dimensionality of the pseudo-semantic domain and derived from a presence of a feature of the extracted features that is specific to the frame.

5. The device of claim 4, wherein generating the semantic model includes creating a generative model from the frames mapped to the pseudo-semantic domain.

6. The device of claim 5, wherein creating the generative model includes recursively identifying a set of key frames in the frames by adding a frame with a highest score to the set of frames, the score of a frame being the inverse of the sum of a square norm of the coordinate of the frame multiplied by a constant and divided by the square of the norm of the distance between the frame and a frame in the set of key frames for all members of the set of key frames.

7. The device of claim 1, wherein assigning respective relevancy scores to the frames includes extracting behavioral indicators of a person who took the video from the video.

8. The device of claim 7, wherein the behavioral indicators includes at least one of a lack of motion of a camera used to capture the video or an increased zoom of the camera used to capture the video to indicate an increased relevancy.

9. The device of claim 1, comprising controller to:
present a user interface including the sub-scenes in an order in which they were produced;
receive a discard selection from a user for a sub-scene; and
discard the sub-scene from a video summarization.

10. A method of automatic summarization carry out by machine:
obtaining a video;
generating a semantic model of the video from frames of the video; assigning respective relevancy scores to the frames;
initializing the semantic model with the respective relevancy scores including constructing a graph in which nodes correspond to the frames, node values correspond to respective relevancy scores of the frames, and edges are weighted by the inverse distance between frames established in the semantic model: and
iteratively processing the semantic model to produce a set of sub-scenes, each iteration comprising:
converging the semantic model following initialization;
selecting a sequence of frames with a highest relevancy score after converging; and
re-initializing the semantic model by fixing the relevancy scores for the selected sequence of frames.

11. The method of claim 10, wherein generating the semantic model includes extracting features of the frames.

12. The method of claim 11, wherein generating the semantic model includes generating a pseudo-semantic domain from the extracted features, wherein the pseudo-semantic domain is an n-dimensional space derived from the features.

13. The method of claim 12, wherein generating the semantic model includes mapping the frames to the pseudo-semantic domain by, for each frame, deriving a coordinate in the pseudo-semantic domain, each element of the coordinate corresponding to a dimensionality of the pseudo-semantic domain and derived from a presence of a feature of the extracted features that is specific to the frame.

14. The method of claim 10, wherein assigning respective relevancy scores to the frames includes extracting behavioral indicators of a person who took the video from the video.

15. The method of claim 14, wherein the behavioral indicators includes at least one of a lack of motion of a camera used to capture the video or an increased zoom of the camera used to capture the video to indicate an increased relevancy.

16. The method of claim 10, comprising:
presenting a user interface including the sub-scenes in ark order in which they were produced;
receiving a discard selection from a user for a sub-scene; and
discarding the sub-scene from a video summarization.

17. At least one non-transitory computer-readable medium including instructions that, when executed by a machine, cause the machine to perform operations for automatic video summarization, the operations comprising:
obtaining a video;
generating a semantic model of the video from frames of the video; assigning respective relevancy scores to the frames;
initializing the semantic model with the respective relevancy scores including constructing a graph in which nodes correspond, to the frames, node values correspond to respective relevancy scores of the frames, and edges are weighted by the inverse distance between frames established in the semantic model; and
iteratively processing the semantic model to produce a set of sub-scenes, each iteration comprising:
conversing die semantic model following initialization;
selecting a sequence of frames with a highest relevancy score after converging; and
re-initializing the semantic model by fixing the relevancy scores for the selected sequence of frames.

18. The at least one machine readable medium of claim 17, wherein generating the semantic model includes extracting features of the frames.

19. The at least one machine readable medium of claim 18, wherein generating the semantic model includes generating a pseudo-semantic domain from the extracted features, wherein the pseudo-semantic domain is an n-dimensional space derived from the features.

20. The at least one machine readable medium of claim 19, wherein generating the semantic model includes mapping the frames to the pseudo-semantic domain by, for each frame, deriving a coordinate in the pseudo-semantic domain, each element of the coordinate corresponding to a dimensionality of the pseudo-semantic domain and derived from a presence of a feature of the extracted features that is specific to the frame.

21. The at least one machine readable medium of claim 20, wherein generating the semantic model includes creating a generative model from the frames mapped to the pseudo-semantic domain.

22. The at least one machine readable medium of claim 21, wherein creating the generative model includes recursively identifying a set of key frames in the frames by adding a frame with a highest score to the set of frames, the score of a frame being the inverse of the sum of a square norm of the coordinate of the frame multiplied by a constant and divided by the square of the norm of the distance between the frame and a frame in the set of key frames for all members of the set of key frames.

23. The at least one machine readable medium of claim 17, wherein assigning respective relevancy scores to the frames includes extracting behavioral indicators of a person who took the video from the video.

24. The at least one machine readable medium of claim 23, wherein the behavioral indicators includes at least one of a lack of motion of a camera used to capture the video or an increased zoom of the camera used to capture the video to indicate an increased relevancy.

25. The at least one machine readable medium of claim 17, where the instructions comprise:
presenting a user interface including the sub-scenes in an order in which they were produced;
receiving a discard selection from a user for a sub-scene; and
discarding the sub-scene from a video summarization.

* * * * *

UNITED STATES PATENT AND TRADEMARK OFFICE
CERTIFICATE OF CORRECTION

PATENT NO.        : 9,818,032 B2
APPLICATION NO.   : 14/925701
DATED             : November 14, 2017
INVENTOR(S)       : Yehezkel Rohekar et al.

Page 1 of 1

It is certified that error appears in the above-identified patent and that said Letters Patent is hereby corrected as shown below:

In the Claims

In Column 35, Line 41, in Claim 10, after "video;", insert --¶--

In Column 36, Line 24, in Claim 17, after "video;", insert --¶--

Signed and Sealed this
Fourth Day of June, 2019

Andrei Iancu
*Director of the United States Patent and Trademark Office*